United States Patent [19]
Takagi

[11] Patent Number: 5,495,457
[45] Date of Patent: Feb. 27, 1996

[54] DATA PROCESSING SYSTEM USING AN OPTICAL DISC APPARATUS

[75] Inventor: Shiro Takagi, Yokohama, Japan

[73] Assignee: Kabushiki Kaisha Toshiba, Kawasaki, Japan

[21] Appl. No.: 308,459

[22] Filed: Sep. 19, 1994

[30] Foreign Application Priority Data

Mar. 16, 1994 [JP] Japan .................. 6-045486

[51] Int. Cl.⁶ .................. G11B 17/22
[52] U.S. Cl. .............. 369/30; 369/34; 395/375; 395/200.01
[58] Field of Search ............... 369/30, 32, 33, 369/34; 360/49, 69; 395/275, 375, 475, 425, 800, 325

[56] References Cited

U.S. PATENT DOCUMENTS 5,210,835  5/1993  Sakamura et al. ............ 395/375
5,235,578  8/1993  Bass et al. .................. 369/33
5,386,516  1/1995  Monahan et al. ............ 395/275

FOREIGN PATENT DOCUMENTS 528615  2/1993  Japan .

OTHER PUBLICATIONS

Nikkei Byte, Published on May 1992; pp. 211–213.

Primary Examiner—Ali Neyzari
Attorney, Agent, or Firm—Cushman, Darby & Cushman

[57] ABSTRACT

In a disc apparatus, past access records concerning data items stored in the optical disc apparatus and exchange records of optical discs are managed, and access frequencies in the future are estimated on the basis of these records. Data items estimated to be accessed at a high frequency are stored into a cash HDD as a high-speed device, and data items estimated to be accessed at a middle frequency are collected into a specific optical disc. This specific optical disc is continuously installed in an optical disc drive. As a result, the response ability of the apparatus is greatly improved.

14 Claims, 23 Drawing Sheets

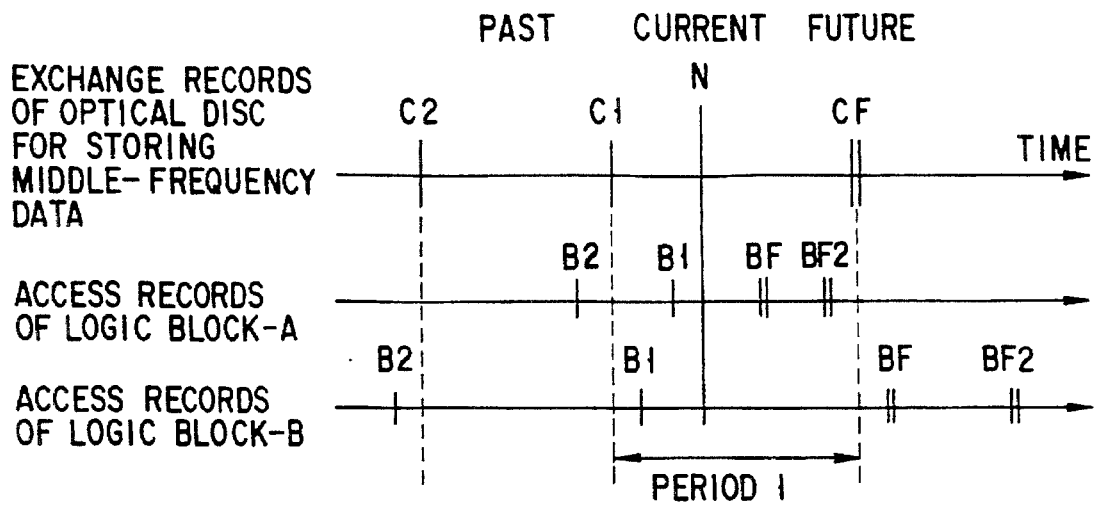

C1 : TIME POINT WHEN RECENTLY FILLED AND EXCHANGED
C2 : TIME POINT OF EXCHANGE BEFORE C1
CF : ESTIMATED TIME POINT OF NEXT EXCHANGE
$C1 + (C1 - C2) \cdot K \qquad (K > 1)$ B1 : TIME POINT WHEN RECENTLY ACCESSED
B2 : TIME POINT OF ACCESS BEFORE B1
BF : ESTIMATED TIME POINT 1 OF NEXT ACCESS
$B1 + (B1 - B2)$
BF2 : ESTIMATED TIME POINT 2 OF NEXT ACCESS
$N + (N - B2)$

---

METHOD 1 : MIDDLE-FREQUENCY BLOCK IF BF
IS WITHIN PERIOD 1 (BLOCK-A)
LOW-FREQUENCY BLOCK IF BF
IS OUT OF PERIOD 1 (BLOCK-B)

METHOD 2 : MIDDLE-FREQUENCY BLOCK IF BF2
IS WITHIN PERIOD 1 (BLOCK-A)
LOW-FREQUENCY BLOCK IF BF2
IS OUT OF PERIOD 1 (BLOCK-B)

F I G. 3

STRUCTURE MANAGEMENT TABLE

| | |
|---|---|
| NUMBER OF OPTICAL DISCS | 10 |
| TOTAL NUMBER OF PHYSICAL BLOCKS / OPTICAL DISC | 256K |
| TOTAL NUMBER OF CACHE HDD BLOCKS | 100K |
| NUMBER OF OPTICAL DISC DRIVES | 4 |
| NUMBER OF EMPTY OPTICAL DISCS | 1 |
| PROCESSING MODE (NORMAL / GARBAGE) | NORMAL |

F I G. 6

MIDDLE-FREQUENCY DATA OPTICAL DISC MANAGEMENT TABLE

| | |
|---|---|
| OPTICAL DISC No. | 10 |
| OPTICAL DISC EXCHANGE TIME 1 | 00:00 |
| OPTICAL DISC EXCHANGE TIME 2 | 00:00 |

F I G. 7

LOGIC BLOCK MANAGEMENT TABLE

| LOGIC BLOCK No. | LOGIC FLAG | OPTICAL DISC No. | PHYSICAL BLOCK No. | ACCESS TIME 1 | ACCESS TIME 2 |
|---|---|---|---|---|---|
| 1 | C | 1 | 1 | 00:00 | 00:00 |
| 2 | C | 1 | 2 | 00:00 | 00:00 |
| ⋮ | ⋮ | ⋮ | ⋮ | ⋮ | ⋮ |
| 256K+1 | 0 | 2 | 1 | 00:00 | 00:00 |
| 256K+2 | 0 | 2 | 2 | 00:00 | 00:00 |
| ⋮ | ⋮ | ⋮ | ⋮ | ⋮ | ⋮ |
| 2M | 0 | 8 | 256K | 00:00 | 00:00 |

~33

LOGIC FLAG  0: EXISTING IN ONLY OPTICAL DISC
C: EXISTING IN CACHE (CLEAN) AND OPTICAL DISC
D: EXISTING IN CACHE (DIRTY) AND OPTICAL DISC

F I G. 8

PHYSICAL BLOCK MANAGEMENT TABLE

| OPTICAL DISC No. | PHYSICAL BLOCK No. | PHYSICAL FLAG |
|---|---|---|
| 1 | 1 | USED |
| 1 | 2 | USED |
| ⋮ | ⋮ | ⋮ |
| 2 | 1 | USED |
| ⋮ | ⋮ | ⋮ |
| 8 | 256K | USED |
| 9 | 1 | UNUSED |
| ⋮ | ⋮ | ⋮ |
| 10 | 256K | UNUSED |

~34

F I G. 9

CACHE HDD BLOCK MANAGEMENT

| CACHE HDD BLOCK No. | LOGIC BLOCK No. |
|---|---|
| 1 | 1 |
| 2 | 2 |
| ⋮ | ⋮ |
| 100K | 100K |

~35

F I G. 10

OPTICAL DISK MANAGEMENT TABLE

| OPTICAL DISC No. | PRIORITY FLAG | CONTAINER CELL No. |
|---|---|---|
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | -1 | 9 |
| 10 | 0 | 10 |

~36

PRIORITY FLAG
    -1 : EMPTY OPTICAL DISC
     0 : MIDDLE-FREQUENCY DATA OPTICAL DISC
  POSITIVE : LOW-FREQUENCY DATA OPTICAL DISC

F I G. 11

OPTICAL DISC DRIVE MANAGEMENT TABLE

| OPTICAL DISC DRIVE No. | DRIVE FLAG | OPTICAL DISC No. |
|---|---|---|
| 1 | MIDDLE FREQUENCY | 10 |
| 2 | LOW FREQUENCY | 1 |
| 3 | LOW FREQUENCY | 2 |
| 4 | LOW FREQUENCY | 3 |

~37

DRIVE FLAG
  MIDDLE FREQUENCY : MIDDLE-FREQUENCY DATA OPTICAL DISC
  LOW FREQUENCY    : LOW-FREQUENCY DATA OPTICAL DISC
  GARBAGE : EXECUTING GARBAGE COLLECTION

F I G. 12

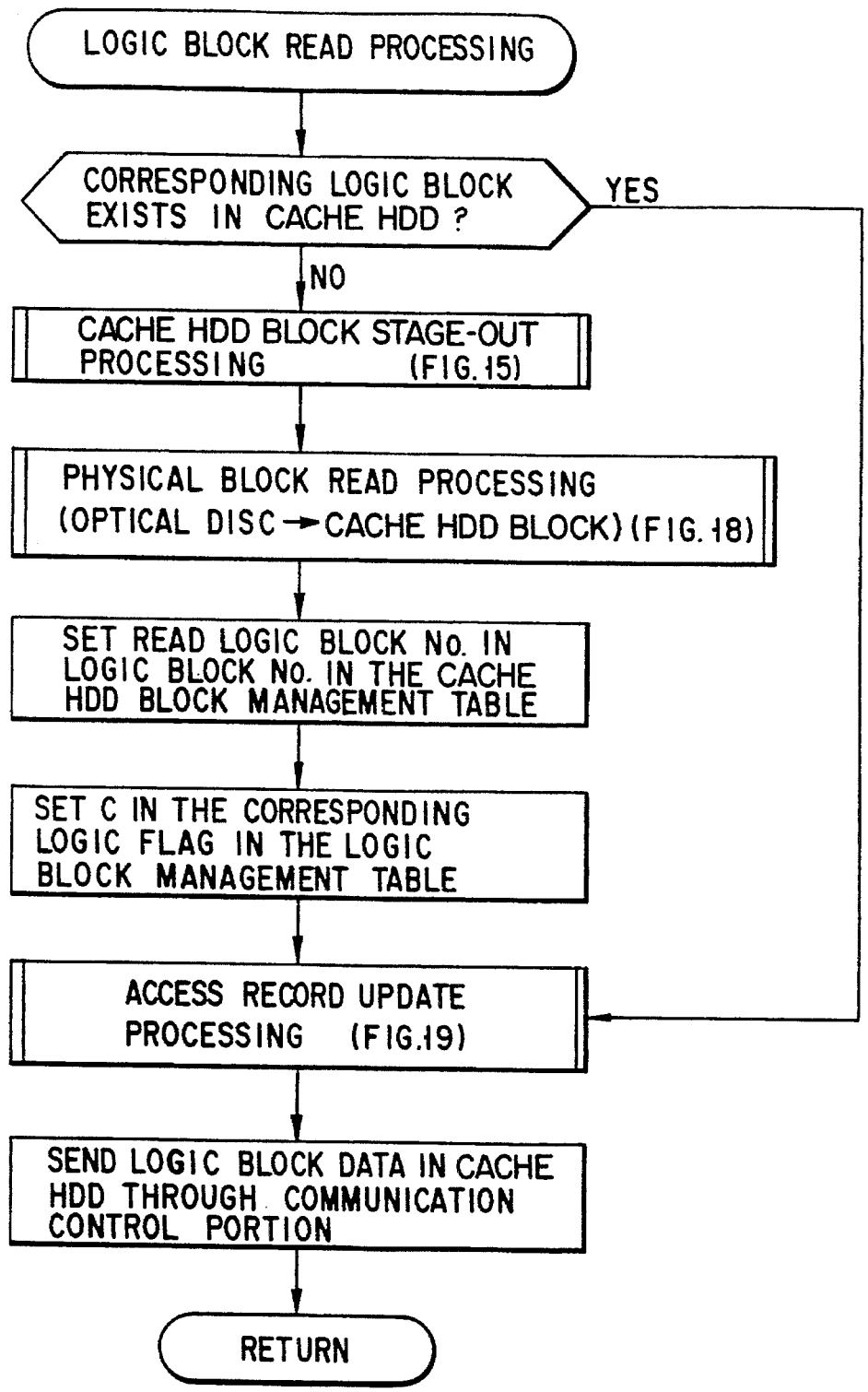
F I G. 14

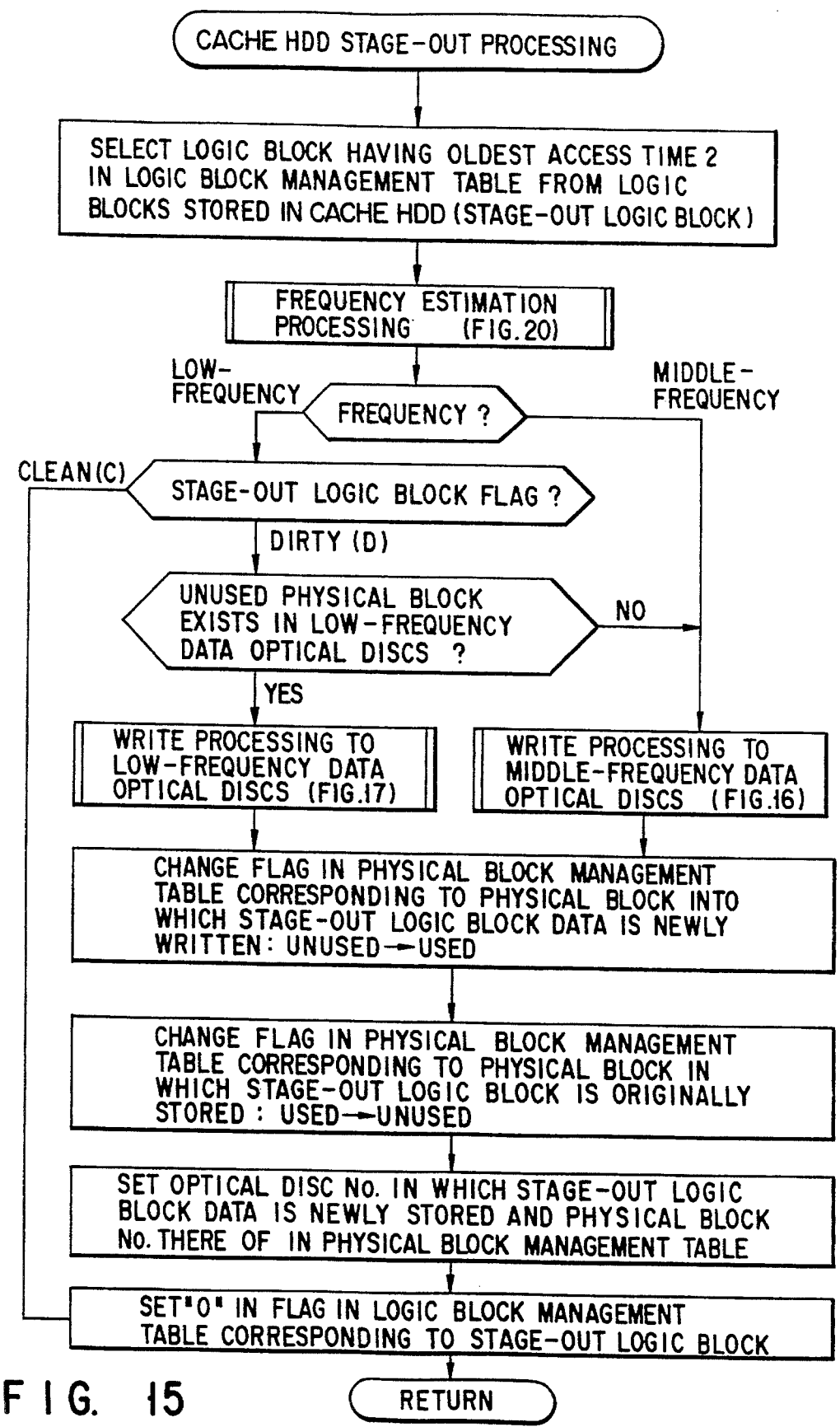
F I G. 15

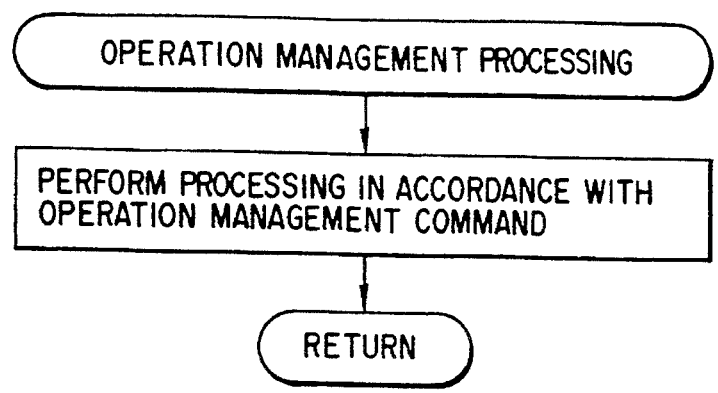
F I G. 23
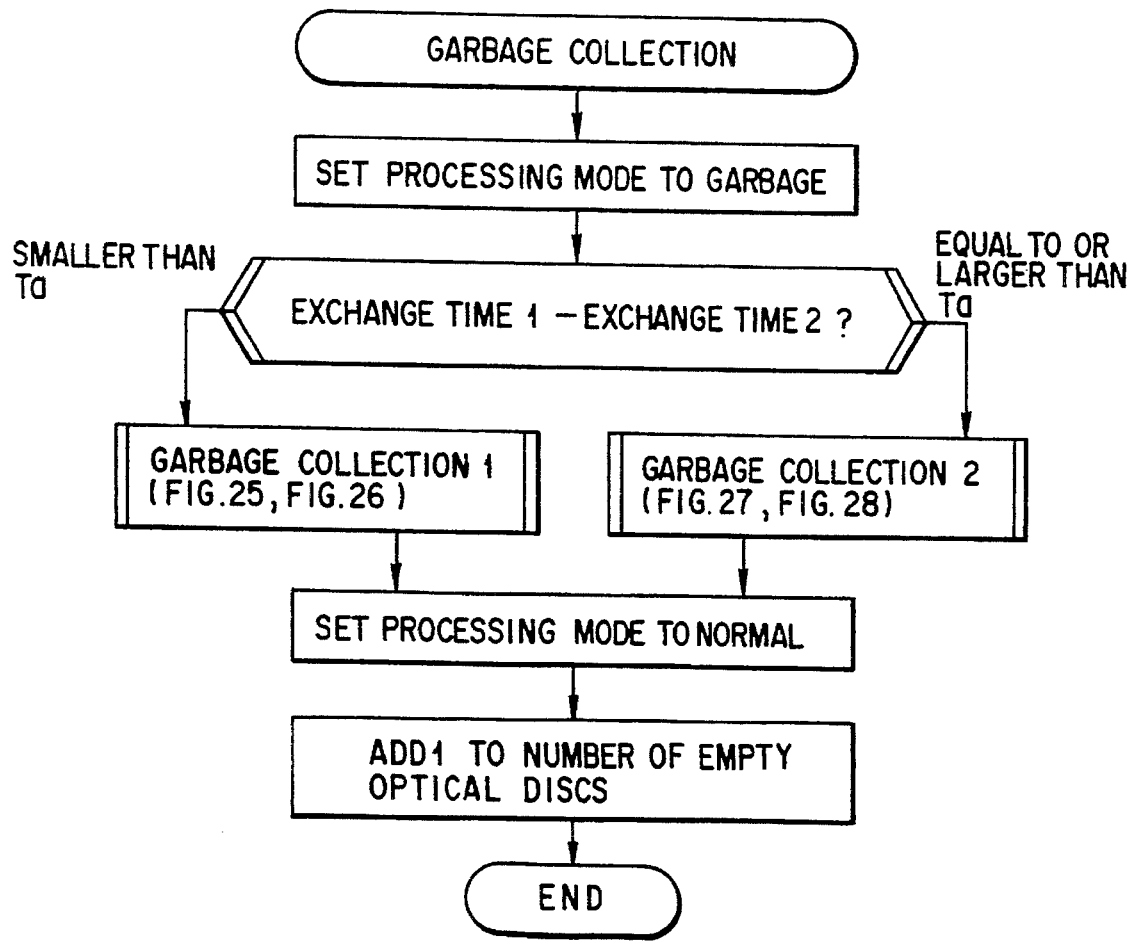
F I G. 24

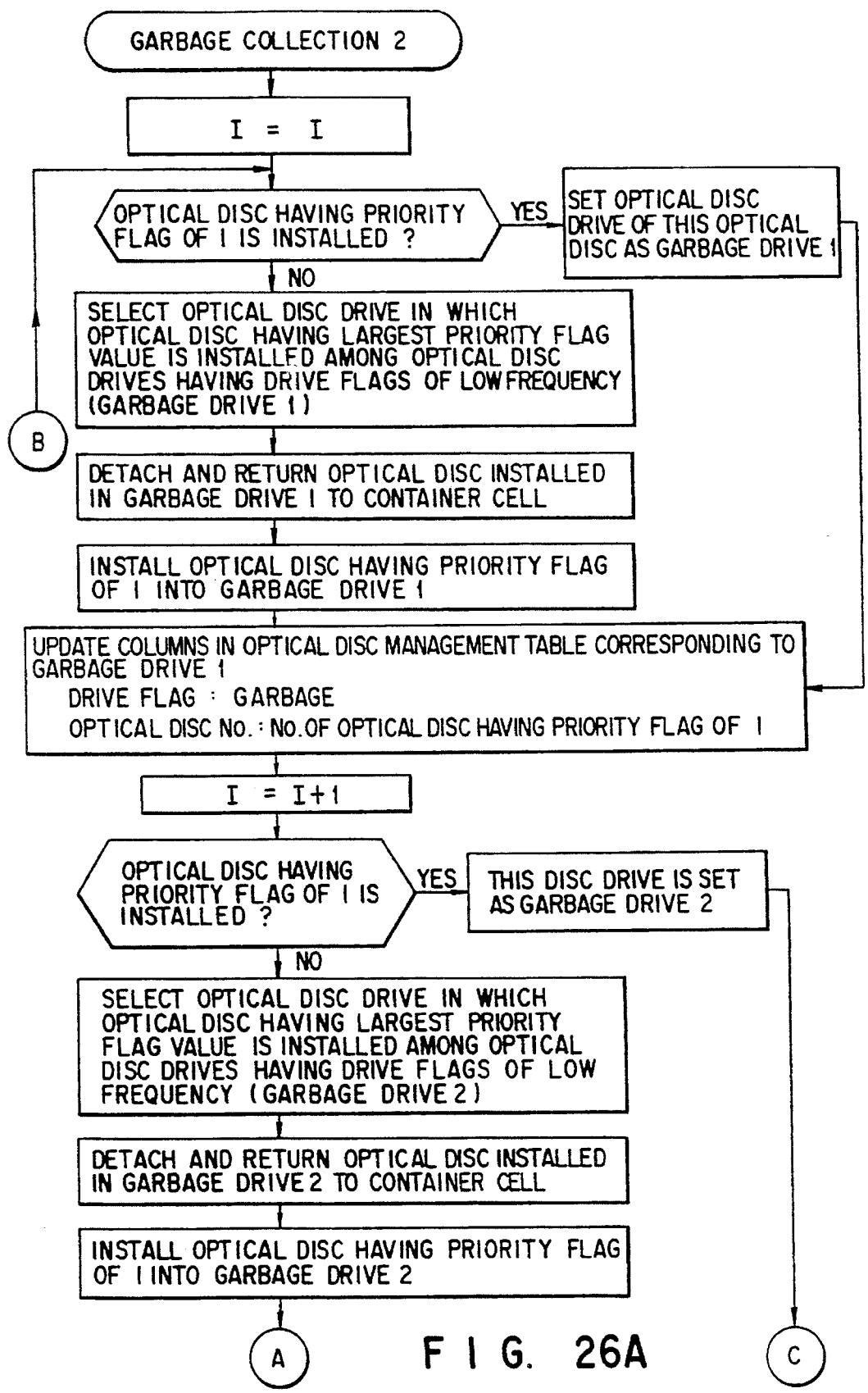
F I G. 26A

DATA PROCESSING SYSTEM USING AN OPTICAL DISC APPARATUS

BACKGROUND OF THE INVENTION

1. Field of the Invention

The present invention relates to an optical disc apparatus for recording data into a plurality of optical discs, and particularly, to an optical disc apparatus including a cache HDD and an optical disc container cell, in addition to an optical disc drive.

2. Description of the Related Art

The amount of data which must normally be managed in an office has been increasing. To manage a great deal of data, many kinds of assembled optical disc apparatus have been proposed, which comprises a container cell for containing a plurality of portable optical discs each having a large capacity, a plurality of optical disc drives, and an accessor (or a so-called automatic changer) for moving the optical discs between the optical disc drives and the container cells.

When using the accessor, however, operations for moving and attaching an optical disc to an optical disc drive from an optical disc container cell and for detaching the disc from the cell require a relatively long time period in comparison with processing operations for reading and writing data. Therefore, "a control method for an assembled optical disc apparatus" was proposed in Jpn. Pat. Appln. KOKAI Publication No. 5-28615 and in this method, containing positions of optical discs are designed such that the distance through which discs are moved is as small as possible.

Further, since an optical disc drive requires a longer time to access a disc than a hard disc drive, an apparatus using a layered memory control method as described below has been practiced in order to achieve a high-speed access.

The apparatus using such a layered memory control method utilizes a characteristic that normally, several items of stored data are frequently accessed, while other items of stored data are not frequently accessed. For example, Nikkei Bite, issued in May, 1992, pages 211 to 213, describes a method in which data items which are frequently accessed are stored into a high-speed device, and data items which are not frequently accessed are stored into an optical disc. In this structure, it is possible to constitute an apparatus which requires lower costs than and apparatus comprised of only semiconductor memories and hard discs, and which achieves performance substantially equal to that of the latter apparatus.

In this kind of assembled optical disc apparatus, data can be stored in three different positions as follows, when access to data is carried out.

Position A: Upper layer memory portion accessed at a high speed, such as, a hard disc, a semiconductor memory, and the like.

Position B: Optical disc installed in an optical disc drive.

Position C: Optical disc in a container cell.

In the case of the position A, access can be achieved at the highest speed in the three positions. In general, an access operation of an optical disc drive is several times slower than that of a hard disc drive, so that access to data stored in the position B requires a time period several times longer to access data stored in position A.

In the case of the position C, when data is read or written, an optical disc previously installed in an optical disc drive must be detached therefrom, and then, an optical disc storing data to be accessed must be attached into the optical disc drive. Therefore, this operation takes a time period several hundred times longer than an operation for accessing data stored in position A. The main factors causing such a long operation are, for example, spin-down processing performed before detaching an optical disc from an optical disc drive (i.e., processing for stopping a motor which rotates an optical disc), and spin-up processing performed after attaching an optical disc to the optical disc drive (i.e., processing for increasing a rotation speed of a motor which rotates the optical disc, to a predetermined rotation speed.)

From the above, it is understood that a time period required for accessing data is extremely long when data to be accessed is stored in an optical disc contained in a container cell. Therefore, it is important to collect data items, which are frequently accessed, not only into the upper layer memory portion but also into an optical disc installed in the optical disc drive.

In a conventional assembled optical disc apparatus, data is stored without distinguishing positions A and B from each other. In other words, a conventional apparatus adopts a method in which data items which are frequently accessed are stored on a hard disc which serves as an upper layer memory portion, while the other data items are merely stored on optical discs. Therefore, whether or not a target disc to which a data item is to be accessed is installed in an optical disc drive is not determined. As a result, when a data item to be accessed is not stored in a hard disc, there is a relatively high possibility that optical discs are exchanged between the optical disc drive and a container cell, and thus, a conventional apparatus exhibits very low response performance.

SUMMARY OF THE INVENTION

Therefore, the present invention has an object to eliminate a drawback of very low response performance in an optical disc apparatus in which items which are frequently accessed are stored on a hard disc as an upper layer memory portion, and other data items are stored onto optical discs. Optical discs need only be exchanged a smaller number of times by concentrating the access to data items to the one of optical discs which has been installed in an optical disc drive. As a result of this, it is possible to provide an optical disc apparatus which has improved response performance.

In order to achieve the above object, a data processing system includes a memory access device for accessing data to a memory; a data processing device for accessing data to a first portable medium and a second portable medium, at a lower data access processing speed than the memory access device; estimation means for estimating an access frequency at which data is assessed; first processing means for storing data which is estimated to be accessed at a high access frequency, on the memory, on a basis of an access frequency estimated by the estimation means; second processing means for storing data which is estimated to be accessed at a middle access frequency, on the first portable medium, on a basis of an access frequency estimated by the estimation means; third processing means for storing data which is estimated to be accessed at a low access frequency, on the third portable medium, on a basis of an access frequency estimated by the estimation means; and management means for managing the first portable medium on which the data estimated to be accessed at the middle access frequency is stored, so as to be continuously inserted in the data processing device.

In the present invention having the above structure, records of access to data stored in a plurality of optical discs in the past and records of exchanges of optical discs in the past can be managed. On the basis of these records, access frequencies in the future are estimated. Data items which are estimated to be accessed at a high frequency are stored into a high-speed device such as a hard disc or the like. Data items which are estimated to be accessed at a middle frequency are stored into a specified optical disc, and data items which are estimated to be accessed at a low frequency are stored into other optical discs. The specified disc storing the data items which are estimated to be accessed at a middle frequency is always attached into an optical disc drive.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a chart which explains processing for estimating an access frequency in the future with respect to logic blocks;

FIG. 6 is an example of records of a structure management table;

FIG. 7 is an example of records of a structure management table for an optical disc used as a middle frequency storage;

FIG. 8 shows an example of records of a logic block management table;

FIG. 9 shows an example of records of a physical block management table;

FIG. 10 shows an example of records of a cash HDD block management table;

FIG. 11 shows an example of records of an optical disc management table;

FIG. 12 shows an example of records of an optical disc drive management table;

FIG. 14 is a flow-chart for explaining logic block read processing;

FIG. 15 is a flow-chart for explaining logic block stage out processing in the cash HDD;

FIG. 23 is a flow-chart for explaining operational management processing;

FIG. 24 is a flow-chart for explaining a garbage collection;

FIG. 26A to 26C are flow-charts for explaining a garbage collection 2.

DETAILED DESCRIPTION OF THE PREFERRED EMBODIMENTS

In the following, an embodiment of the present invention will be explained with reference to the drawings.

Figure 1:
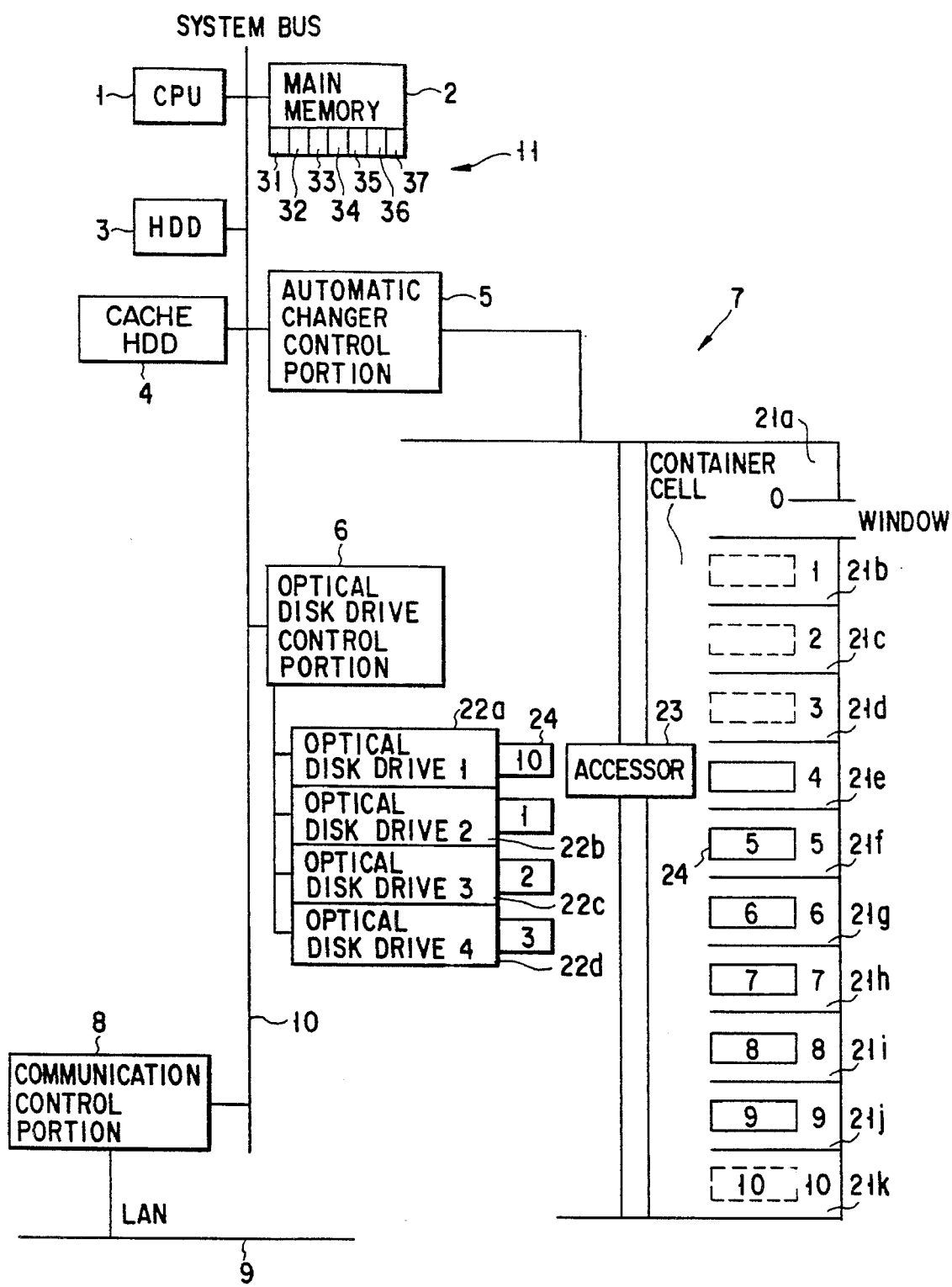
FIG. 1 is a block diagram showing the entire structure of an optical disc apparatus according to an embodiment of the present invention.

FIG. 1 shows a system configuration of an optical disc apparatus according to the present invention. This optical disc apparatus comprises a CPU 1, a main memory 2, an HDD 3, a cache HDD 4, an automatic changer 7, an automatic changer control portion 5, an optical disc drive control portion 6, and a communication control portion 8.

The HDD 3 and main memory 2 are used to store programs and data according to the present invention. The CPU 1 controls operations of the entire apparatus. Programs stored in the HDD 3 are stored into the main memory 2, and respective components or portions of the apparatus are controlled in accordance with the contents of the programs thus stored in the memory 2. The automatic changer 7 comprises a plurality of optical disc container cells 21a to 21k, a plurality of optical disc drives 22a to 22d, and an accessor 23, and is controlled by the automatic changer control portion 5.

Integral numbers of 0 to 10 are respectively designated to the container cells 21a to 21k, and optical discs 24 can be contained in ten container cells 21b to 21k which are respectively designated by numbers 1 to 10. The container cell 21a designated by the number 0 is used as a window for setting optical discs 24 into the automatic changer 7 or pulling them out from the changer.

The optical disc drives 22a to 22d are used to write data into optical discs 24 and read data therefrom. Four optical disc drives 22a to 22d are controlled by an optical disc drive control portion 6. An accessor 23 serves to transfer optical discs 24 between the container cells 21a to 21k and the optical disc drives 22a to 22d. In FIG. 1, optical discs of No. 10 and Nos. 1 to 3 are respectively set in the optical disc drives 22a to 22d, and container cells 21k and 21b to 21d respectively corresponding to the optical discs thus set in are empty as indicted by dashed lines.

The cache HDD is used to store data items which have been recently read from the optical disc drives 22a to 22d, and serves as a high-speed device for storing data items which are accessed most frequently. A cache memory consisting of semiconductor memories and a cache control portion, which are not shown in the figure, are included in the cache HDD 4, and this HDD is operated by an LRU (Least Recently Used) method or the like. An LRU algorithm is based on a hypothesis that "data items recently accessed will be accessed frequently", and is designed to release an data item which was accessed for the oldest opportunity (i.e., the data item which was least recently used), when the cache capacity is full. The communication control portion 8 is connected to a LAN 9. Commands supplied from external devices are received through the LAN 9, and processing results are sent through the LAN.

Respective components of the apparatus are connected with each other by a system bus 10. In addition, optical discs 24 are photo-electro-magnetic discs into which data can be additionally written, and data of which can be deleted or changed.

In the apparatus, all data is managed in units of blocks (each unit block is 1K bytes, i.e., 1,024 bytes). One optical disc 24 has a capacity of 256 M bytes (M is 1,024K), and total ten discs are managed. Of these ten optical discs, a region equivalent to the total capacity of eight discs is used to store data items, and the other region equivalent to the total capacity of two discs is retained as non-used regions. As a result of this, the entire apparatus manages total 2 G bytes (G is 1,024 M) of data equivalent to the capacity of eight optical discs. Meanwhile, the cache HDD has a capacity of 100 M bytes equivalent to about 5% of the total capacity of the apparatus.

Logic block numbers (which will be referred to as Nos. hereinafter) of 1 to 2 M are respectively designated to logic blocks equivalent to the capacity of 2 G bytes which must be managed. Each of logic blocks is managed by No. of the optical disc in which the logic block is stored, the No. of the physical block corresponding to the logic block, and a management table 11 in which an access record of the logic block is recorded. The access record is used to estimate how frequently the logic block will be accessed in the future. Commands supplied through the LAN 9 are a read command for reading a logic block and a write command for writing a logic block, and each of read and write commands specifies a logic block No. When a data item is read, the data item is loaded into the cache HDD and the data item is sent to an external device. When a data item is written, the data item to be written is loaded into the cache HDD and response data is returned. The data items stored in the cache HDD 4 are those of data blocks stored in optical discs, which were copied when recently read out and which were updated when recently written in. Those data items are generally regarded as data blocks which are accessed at an extremely high frequency.

Figure 2:
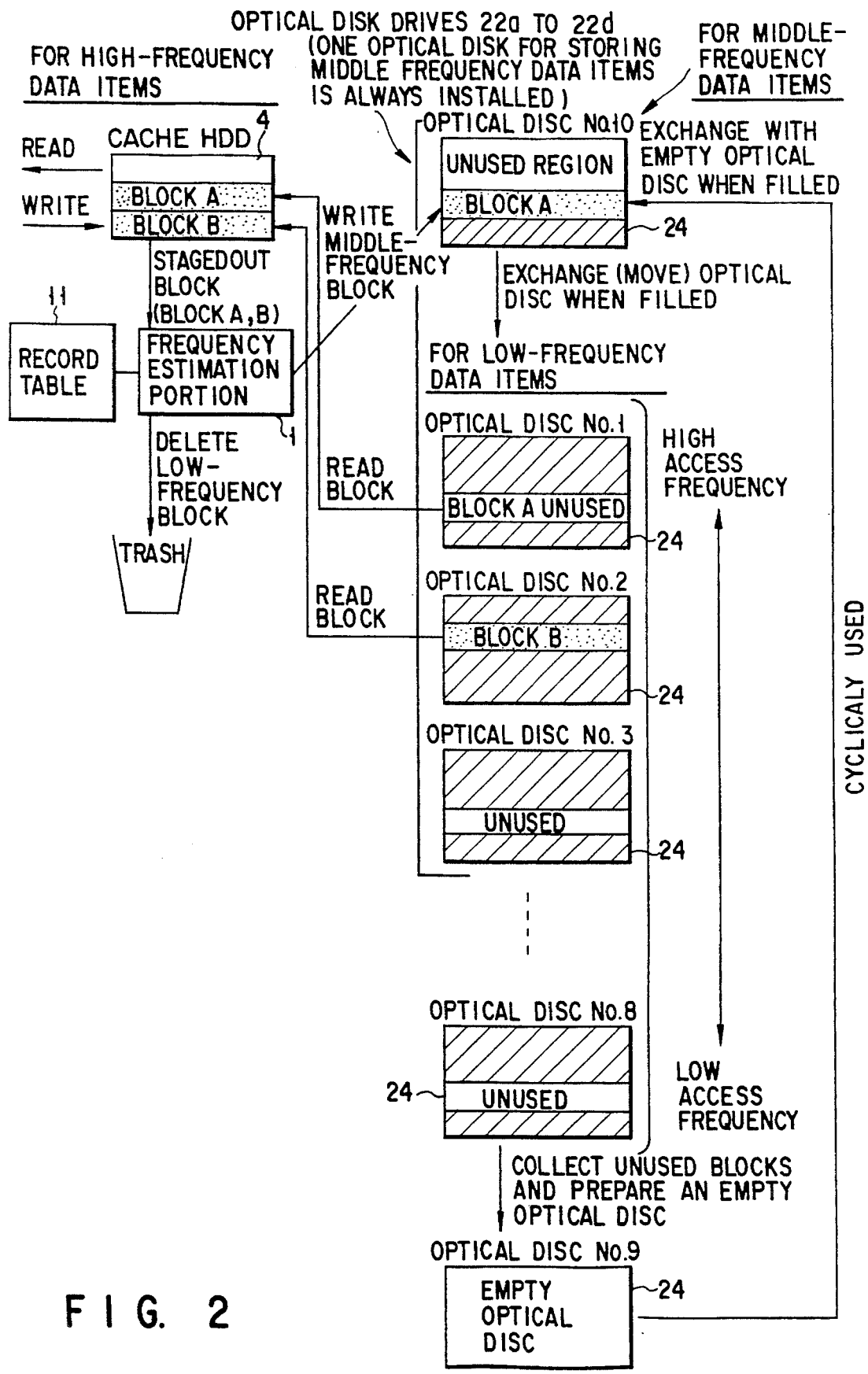
FIG. 2 is a block diagram showing the schematic flow of processing in the optical disc apparatus shown in FIG. 1.

FIG. 2 schematically shows processing of the present apparatus. Logic blocks can be stored into three different positions, i.e., a cache HDD 4 for storing high-frequency blocks which are accessed at a high-frequency, only one of optical discs 24 for storing middle-frequency blocks which are accessed at a middle-frequency, and a plurality of other optical discs 24 for storing low-frequency blocks which are accessed at a low-frequency. The optical disc 24 for storing middle-frequency data items is always installed in one of optical disc drives 22a to 22d.

Optical discs for storing low-frequency data items are installed in the other three optical disc drives than the one optical disc drive in which the optical disc for storing middle-frequency data items are installed. Therefore, remaining optical discs 24 for storing low-frequency data items are contained in container cells 21b to 21k. Further, optical discs for storing low-frequency data items are managed on the basis of the order of access frequencies. FIG. 2 shows that optical discs 24 are arranged the upper the position of an optical disc 24 for storing low-frequency data items is, the higher the frequencies of the logic blocks stored in the optical disc 24 are.

In the following, explanation will be schematically made to processing which is performed when the present apparatus receives a "read" command with respect to a logic block. At first, whether or not the logic block specified by the command exists in the cache HDD 4 is researched, and if yes, the data item of the logic block is returned to an external device. If not, i.e., when the logic block specified by the command does not exist in the cache HDD 4, the optical disc 24 which stores the specified logic block is installed into one of the optical disc drives 22a to 22d. Then, the data item is read from the corresponding physical block, and the data item is returned to an external device after the data item is once stored in the cache HDD 4. In this state, if the cache HDD 4 is full and there is no empty region for storing the data item in the cache HDD 4, a logic block which is estimated to be accessed at the lowest frequency is selected from blocks in the cache HDD 4. Next, processing for staging out the selected block from the cache HDD 4 is performed (stage-out processing). The selected logic block is called a stage-out block.

In the stage-out processing with respect to a logic block, the access frequency in the future is estimated on the basis of access records of the selected stage-out block. When the stage-out block is estimated to be accessed at a middle-frequency in the future, the stage-out block is written into an unused block in the optical disc 24 which is always installed in one of the optical disc drives for storing middle-frequency data items. Then, an unused mark for an unused block is applied to the physical block which once was occupied by an original data item from which the data item of the stage-out block was copied before the stage-out block was stored in the cache HDD 4. On the management table 11, the state of the physical block applied with an unused mark is defined as "unused".

However, if the stage-out block exists in the optical disc 24 for storing middle-frequency data items and the contents of the data item have not been updated, only the data item stored in the cache HDD 4 is deleted. Otherwise, if the contents of the data item of the stage-out block have been updated, the data item of the stage-out block (i.e., the updated data item) is over-written into the region of the optical disc 24 for storing middle-frequency data items:, in which a preceding data item which has not been updated is stored.

If the stage-out block is estimated as a low-frequency block, the data item of this block is deleted from the cache HDD 4. However, if the contents of the stage-out block have been updated, the stage-out block is written into the region applied with an unused mark on the optical disc 24 which is installed in an optical disc drive and will be accessed at the lowest frequency among the optical discs currently installed in optical disc drives.

In FIG. 2, a logic block A is read from the optical disc No. 1 for storing low-frequency data items and is written into the cache HDD 4, when the logic block is read out. Thereafter, the logic block A is estimated as a middle-frequency block and is written into the optical disc No. 10 for storing middle-frequency data items, when this block is staged out. Another logic block B is estimated as a low-frequency block and is simply deleted from the cache HDD 4, when this block is staged out from the cache HDD 4.

When an optical disc 24 for storing middle-frequency data items is filled with data items and has no unused regions, the optical disc 24 is defined as the one of optical disc 24 for storing low-frequency data items, which stores low-frequency data items estimated to be accessed at the highest frequency among the low-frequency data items. Instead, another empty optical disc which contains no data items is newly set as an optical disc 24 for storing middle-frequency data items, and is installed into one of optical disc drives 22a to 22d.

When no optical disc 24 is empty, processing for collecting unused blocks from all the optical discs 24 for storing low-frequency data items (which is called garbage collection) is performed and an empty optical disc 24 is prepared. In this apparatus, since a region having a capacity at least equivalent to the capacity of two optical discs is maintained as unused block regions, another empty optical disc 24 can still be prepared even after one empty optical disc 24 is newly prepared and installed as an optical disc 24 for storing middle-frequency data items. This is because it requires more time to prepare one empty disc by garbage collection. Specifically, an empty disc is prepared in the intervals of various processing, and is immediately assigned to a new optical disc for storing middle-frequency data items, when an optical disc for storing middle-frequency data items is filled with data items. FIG. 2 further shows a state in which an optical disc 24 for storing middle-frequency data items, an optical disc 24 for storing low-frequency data items, and an empty optical disc 24 are shifted in order and cyclically used.

Thus, with respect to a logic block to be staged out from the cache HDD 4, an access frequency in the future is estimated on the basis of access records in the past. Since every logic block which is estimated to be accessed at a middle frequency is always written into an optical disc 24 for storing middle-frequency data items, logic blocks which will be accessed more frequently than those stored in optical discs 24 for storing low-frequency data items and less frequently than those stored in the cache HDD 4 are collected in the optical disc 24 for storing middle-frequency data items. In addition, optical discs 24 for storing low-frequency data items once have been an optical disc 24 for storing middle-frequency data items, and in FIG. 2, the upper the position of an optical disc 24 for storing low-frequency data items is, the more recently the disc was an optical disc 24 for storing middle-frequency data items. When an optical disc 24 for storing low-frequency data items is detached from one of optical disc drives 22a to 22d, the optical disc 24 for storing low-frequency data items, which is set at the lowest position, i.e., which will be accessed at the lowest frequency, is selected, so that optical discs 24 can be changed a fewer number of times.

When the present apparatus receives a write command with respect to a logic block, processing is performed in such a manner in which an empty region is first retained in the cache HDD 4, a data item to be written is loaded into the empty region, and a processing result is returned to an external device. When there is no empty region in the cache HDD, stage-out processing is carried out in the same manner as in the above case of receiving a read command.

Next, how an access frequency in the future is estimated with respect to a stage-out block will be explained with reference to FIG. 3. In the present apparatus, an access record for each logic block and an exchange record for an optical disc 24 for storing middle-frequency data items are managed. In this case, a record of the means of the times of the last two processing operations.

In FIG. 3, the lateral axis indicates time and this lateral axis extends from the left side indicating the past time through the current time to the right side indicating the future. The current time is expressed as N. C1 denotes the last time point when an optical disc 24 for storing middle-frequency data items was exchanged, and C2 denotes the second last time point when an optical disc 24 for storing middle-frequency data items was exchanged. CF denotes an estimated time point when an optical disc 24 for storing middle-frequency data items is estimated to be exchanged next. B1 denotes the last time point when a logic block was accessed, and B2 denotes the second last time point when the logic block was accessed.

In estimation processing for estimating an access frequency, at first, the next access time point is estimated with a logic block, and the time point when an optical disc 24 for storing middle-frequency data items is filled with data and is exchanged with an empty optical disc 24. If the next estimated access time point is within a time period (from C1 to CF) for which the current optical disc 24 for storing middle-frequency data items is estimated to be kept installed, the logic block is determined as a middle-frequency block, and if the next estimated access time is out of the time period, the logic block is determined as a low-frequency block.

A next access time point with respect to a logic block can be estimated in two different methods, and is calculated as follows:

Method 1: $BF=B1+(B1-B2)$

Method 2: $BF2=N+(N-B2)$

The method 1 uses both of B1 and B2 and is adopted where an access cycle with respect to each logic block is relatively stable. The method 2 uses only B2 and is adopted where the access cycle with respect to each logic block greatly changes.

An exchange time with respect to an optical disc 24 for storing middle-frequency data items is estimated by the following relation:

$CF=C1+(C1-C2) \cdot K (K \geq 1)$

Thus, the time period for which the current optical disc 24 for storing middle-frequency data items is estimated to be kept installed is a period defined between C1 and CF. In both methods, the next access time BF or BF2 may be estimated to be before the current time N.

In the method 1, a logic block is determined as a middle-frequency block when BF is within the time period for which the current optical disc 24 for storing middle-frequency data items is estimated to be kept installed, while a logic block is as a low-frequency block when BF is out of the time period. FIG. 3 shows that the logic block A is determined as a middle-frequency block and the logic block B is determined as a low-frequency block. In the method 2, an estimated access time point in the future is determined on the basis of calculated BF2.

The value K used for calculating CF is set in accordance with a deviation of accesses to logic blocks toward the optical disc for storing middle-frequency data items among all the optical discs. When the deviation of accesses is large (i.e., when accesses to logic blocks are concentrated to optical discs closer to the optical disc for storing middle-frequency data items), logic blocks which are accessed at relatively higher frequencies are also concentrated to the optical disc 24 for storing low-frequency data items which is accessed most frequently but the optical disc for storing middle-frequency data items, and therefore, the value K is set to a large value. On the contrary, when the deviation of accesses is small (when accesses to logic blocks are relatively evenly carried out with respect to all the optical discs), logic blocks which are accessed at higher frequencies are not concentrated to particular optical discs 24. In this case, if the value K is large, a logic block which is accessed at a substantially low frequency may be written into the optical disc 24 for storing middle-frequency data items when stage-out processing is carried out. As a result, the optical disc 24 for storing middle frequency data items is filled with data at a short cycle, so that the number of times for which garbage collection is carried out is increased, thereby disadvantageously deteriorating the performance of the apparatus. Therefore, the value K is set to a small value close to 1.

Figure 4:
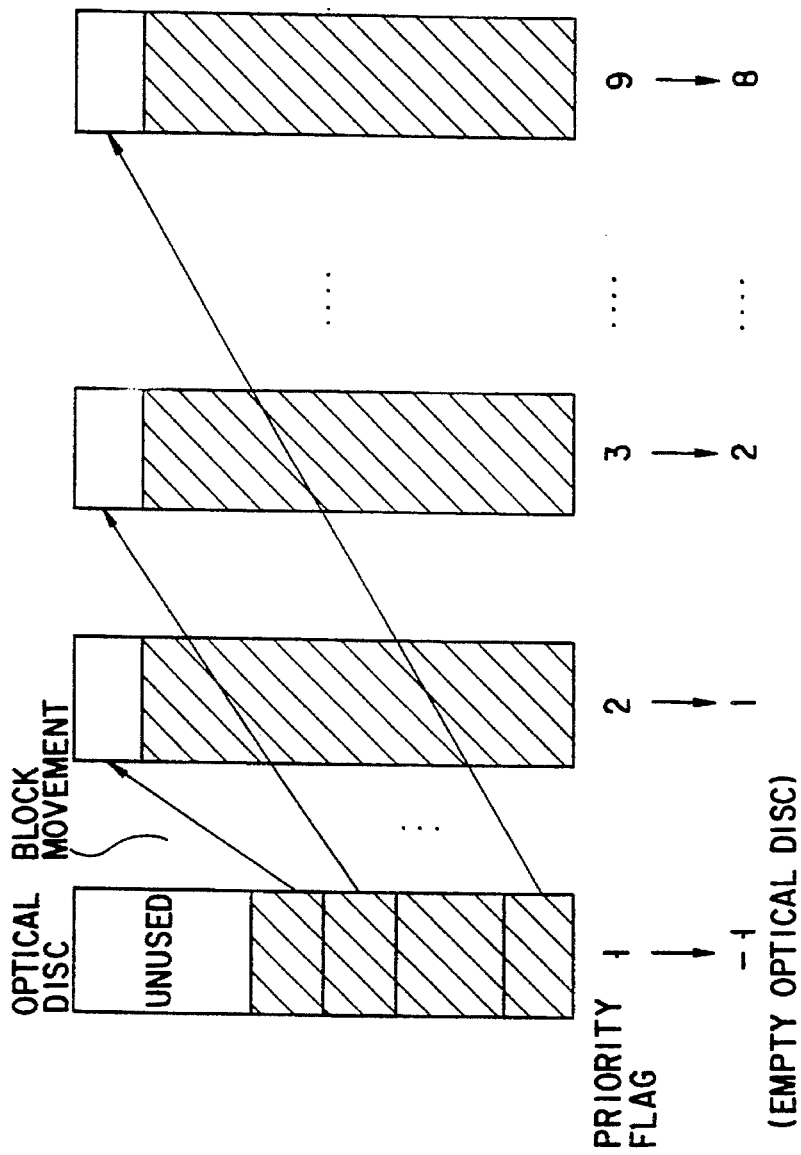
FIG. 4 is a schematic view showing a garbage collection 1.
Figure 5:
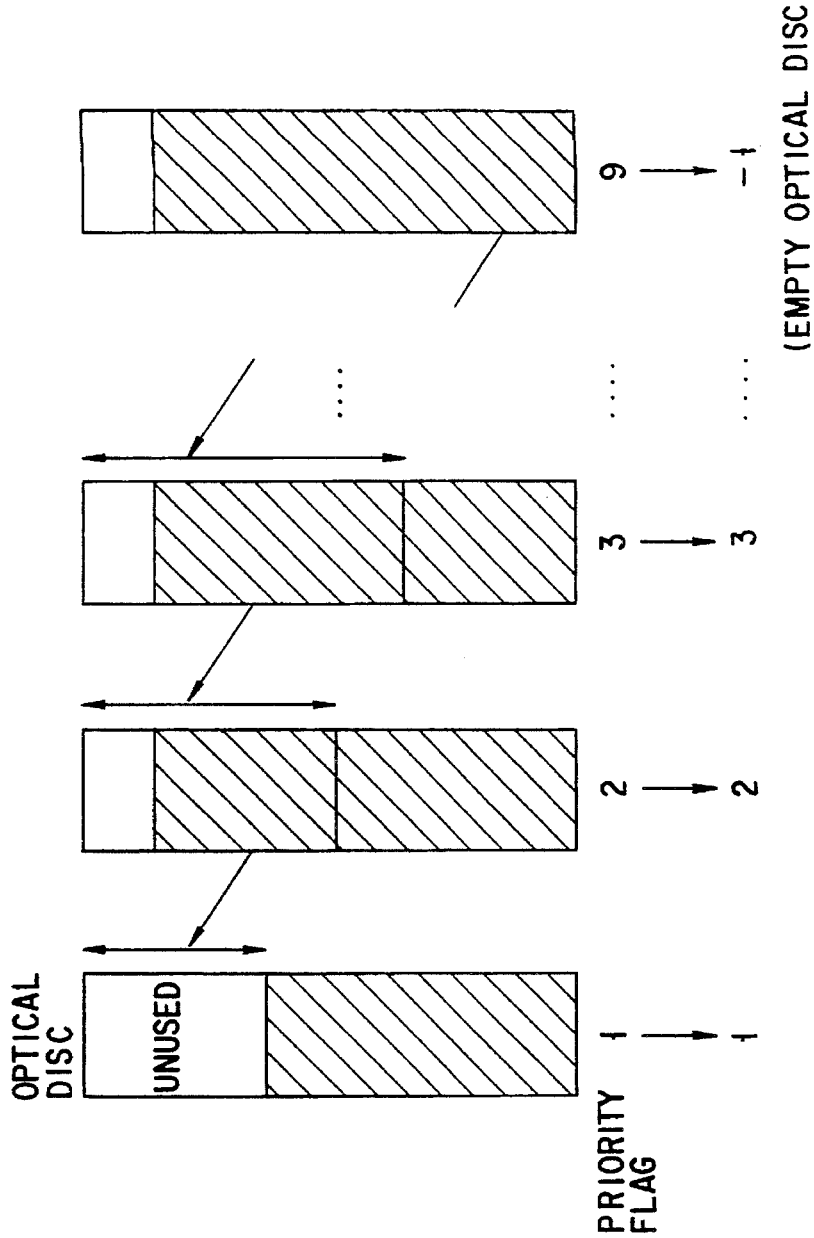
FIG. 5 is a schematic view showing a garbage collection 2.

The garbage collection will be schematically explained below. In the following, it is supposed that unused regions are collected from nine optical discs 24 to prepare one empty optical disc 24. There are two kinds of garbage collection, e.g., garbage collection 1 and garbage collection 2. FIG. 4 shows the garbage collection 1 and FIG. 5 shows the garbage collection 2. In the garbage collection 1, a minimum movement of a block is considered as the most significant factor. In the garbage collection 2, the most significant factor is to maintain the order of access frequencies of logic blocks (or optical discs).

In FIGS. 4 and 5, hatched regions are used for logic block data, and the optical discs 24 are disposed such that the closer to the left-end the position of the optical disc is, the higher the access frequencies of data items stored in the disc are.

In the processing of the garbage collection 1 shown in FIG. 4, the physical block data items stored in the left-end optical disc 24 are all moved to unused physical blocks of the other optical discs 24, and the left-end optical disc 24 becomes an empty optical disc 24. In this case, the number of the blocks which must be moved is not greater than the number of blocks equivalent to the capacity of one disc, and therefore, the processing can be achieved at a high speed. However, since logic blocks stored in the left-end optical disc 24 which are accessed at higher frequencies are distributed to other optical discs 24, the order of logic blocks in accordance with their access frequencies is confused.

The garbage collection 2 is a method in which processing is performed is carried out with first priority to maintenance of the order logic blocks in accordance with access frequencies. At first, several used physical block data items of the second optical disc 24 from the left-end are transferred to the left-end optical disc 24, so as to fulfill all the unused physical blocks of the left-end optical disc 24. Thereafter, data items are transferred to the second optical disc 24 from the left-end, from the third optical disc 24 from the left-end, in the same manner as in the above case. This operation is repeated until data items are transferred from the right-end optical disc 24. In this manner, the order of logic blocks in accordance with access frequencies can be maintained. The number of logic blocks which must be moved is relatively large in comparison with the garbage collection 1, and therefore, a long time period is required to complete the processing.

In the present apparatus, the garbage collection 1 and the garbage collection 2 are selectively used in accordance with application conditions of the apparatus. Specifically, when the apparatus allows excessive processing, the garbage collection 2 is used, while the garbage collection 1 is used when the apparatus is busy.

Next, management tables and contents of processing of the present apparatus will be specifically explained.

FIGS. 6 to 12 show the initial state of management table 11 used in the present apparatus. In the initial state, data is not written in the apparatus, and all the data is set to "0". Further, all the logic blocks No. 1 to No. 2 M are distributed to eight optical discs 24 for storing low-frequency data items, and total 100K of logic blocks No. 1 to No. 100K are set in the cash HDD 4.

FIG. 6 shows a structure management table 31 which represents the structure of the entire apparatus. The "number of optical discs" is the total number of optical discs managed by the present apparatus, and is 10 in this case. Nos. 1 to 10 are respectively assigned to the optical discs. The "total number of physical blocks/optical disc" denotes the total number of physical blocks in one optical disc, and is 256K in this case. Physical block Nos. 1 to 256K are respectively assigned to the physical blocks.

One block consists of 1K bytes, and therefore, one optical disc has a capacity of 256 M bytes. The "total number of cash HDD blocks" is the number of total blocks in the cash HDD 4, and is 100K in this case. Cash block Nos. 1 to 100K are respectively assigned to cash HDD blocks. The cash HDD has a capacity of 100 M bytes and is equivalent to about 5% of the entire management capacity (2 G bytes) of the present apparatus. The "number of optical disc drives" is the total number of optical disc drives 2a to 2d included in the automatic changer 7, and is 4 in this case. Optical disc drive Nos. 1 to 4 are respectively assigned to the optical disc drives. The "number of empty discs" is the number of empty optical discs 24 which are currently not used, and is 1 in this case.

The "processing mode" indicates what kinds of processing is performed by the apparatus, and is a normal processing mode in this case, in which processing required through external commands is performed. When there is no empty optical disc, the processing mode is set to a garbage collection mode, and garbage collection for preparing an empty disc is performed in parallel with command processing.

FIG. 7 shows a middle-frequency data optical disc management table 32 relating to an optical disc 24 for storing middle-frequency data items, into which a logic block staged-out from the cache HDD 4 and determined as a middle-frequency block is written. The "optical disc No." is the No. of optical disc which is currently used as an optical disc 24 for storing middle-frequency data items, and is 10 in this case. The "optical disc exchange time point 1" and the "optical disc exchange time point 2" are respectively time points when optical discs are exchanged for the last time and the second last time, and are both set to 00:00 in this case, since discs have not yet been exchanged in the initial state.

FIG. 8 shows a logic block management table 33 for managing all the 2 M logic blocks. The "optical disc No." and the "physical block No." are respectively the No. of the optical disc 24 and the No. of the physical block in the disc, in which a certain logic block is actually stored. The "access time point 1" and the "access time point 2" are respectively the time points when a logic block were accessed by an external device for the last time and the second last time. The "logic flag" indicates one of three states concerning data of a logic block, i.e., a state O (optical disc) in which the data of a logic block exists only in an optical disc 24, a state C (clean) in which the same data of a logic block exists both in an optical disc 24 and in the cash HDD 4, and a state D (dirty) in which the data of a logic block existing in an optical disc 24 is updated and stored also in the cache HDD 4.

For example, the data item of a logic block No. 1 is stored in a physical block No. 1 of the optical disc 24 assigned to No. 1, and this data has not yet been accessed, so that both of the access time points 1 and 2 are 00:00. Data items of logic blocks Nos. 1 to 100 K exist in both of the cache HDD 4 and an optical disc, and therefore, the logic flag indicates "C" with respect to each of these logic blocks. Data items of the other logic blocks exist only in optical discs, and therefore, the logic flag indicates "O" with respect to these logic blocks.

When a logic block is read from an optical disc 24 onto the cash HDD 4 in response to reading processing by an external device, the logic flag of the logic block is changed from "O" to "C". When a logic block is staged out from the cache HDD, the logic flag of the logic block is changed from "C" to "O". When a data block is written by an external device, the logic flag is set to "D". When this logic block is staged out, the logic flag is changed from "D" to "O", FIG. 9 shows a physical block management table 34 for managing physical blocks in ten optical discs 24, in the order from the physical block No. 1 of the optical disc No. 1. The "physical flag" indicates whether a corresponding physical block is "used" or "unused" as a logic block. In the initial state, all the physical blocks in the optical discs No. 1 to No. 8 are used as logic blocks, and the physical blocks in the optical discs No. 9 and No. 10 are all set as "unused" logic blocks.

If a logic block is estimated to be a middle-frequency block when the logic block is staged out from the cache HDD 4, the physical flag of the corresponding physical block in an optical disc 24 for storing low-frequency data items is set to "unused", and the stage-out block is written into an unused physical block in the optical disc 24 for storing middle-frequency data items. The physical flag of the physical block is then changed to "used".

FIG. 10 shows a cache HDD block management table 35 for managing 100K logic blocks contained in the cache HDD 4. The Nos. of the blocks contained in the cache HDD are respectively set as the "logic block Nos."

FIG. 11 shows an optical disc management table 36 for managing total ten optical discs 24 in the present apparatus. The "priority flag" is a value indicating the level as to how frequently data items stored in an optical disc 24 are accessed, and the smaller this value is, the more frequently the data items stored in the optical disc are accessed. Note that the value of "−1" means an empty optical disc 24, i.e., no data items are stored in the optical disc. The value of "0" means an optical disc 24 for storing middle-frequency data items, and when the value is positive, the value means an optical disc 24 for storing low-frequency data items. In the initial state, the optical discs No. 1 to No. 8 are set as discs for storing low-frequency data items, the optical disc No. 9 is set as an empty optical disc, and the optical disc No. 10 is set as an optical disc for storing middle-frequency data items. The "container cell Nos." are the Nos. of container cells 21a to 21k contained in the automatic changer 7. Every time when an optical disc 24 is detached from one of optical disc drives 22a to 22d, an optical disc 24 corresponding to the container cell No. is always contained into the container cell.

FIG. 12 shows an optical disc drive management table 37 for managing four optical disc drives 22a to 22d. The "optical disc Nos." are the Nos. of the optical discs 24 installed in the optical disc drives 22a to 22d. In the initial state, the optical disc No. 10 which is an optical disc 24 for storing middle-frequency data items is installed in the optical disc drive No. 1 which is the optical disc drive 22a, and the optical disc No. 1 which is an optical disc 24 for storing low-frequency data items is installed in the optical disc drive No. 2 which is the optical disc drive 22b. The optical disc No. 2 which is an optical disc 24 for storing low-frequency data items is installed in the optical disc drive No. 3 which is the optical disc drive 22c, and the optical disc No. 3 which is an optical disc 24 for storing low-frequency data items is installed in the optical disc drive No. 4 which is an optical disc drive 22d. The "drive flag" indicates one of three states, i.e., a middle-frequency state, a low-frequency state, and a garbage state. When a drive flag indicates the middle-frequency state, the drive flag means that an optical disc 24 for storing middle-frequency data items is installed in the optical disc drive corresponding to the drive flag. When a drive flag indicates the low-frequency state, the drive flag means that an optical disc 24 for storing low-frequency data items is installed in the optical disc drive corresponding to the drive flag. When a drive flag indicates the garbage collection state, the drive flag means that the optical disc drive corresponding to the drive flag is used for garbage collection.

FIGS. 13 to 18 are flow-charts showing processing operations of the control portion of the present apparatus.

Figure 13:
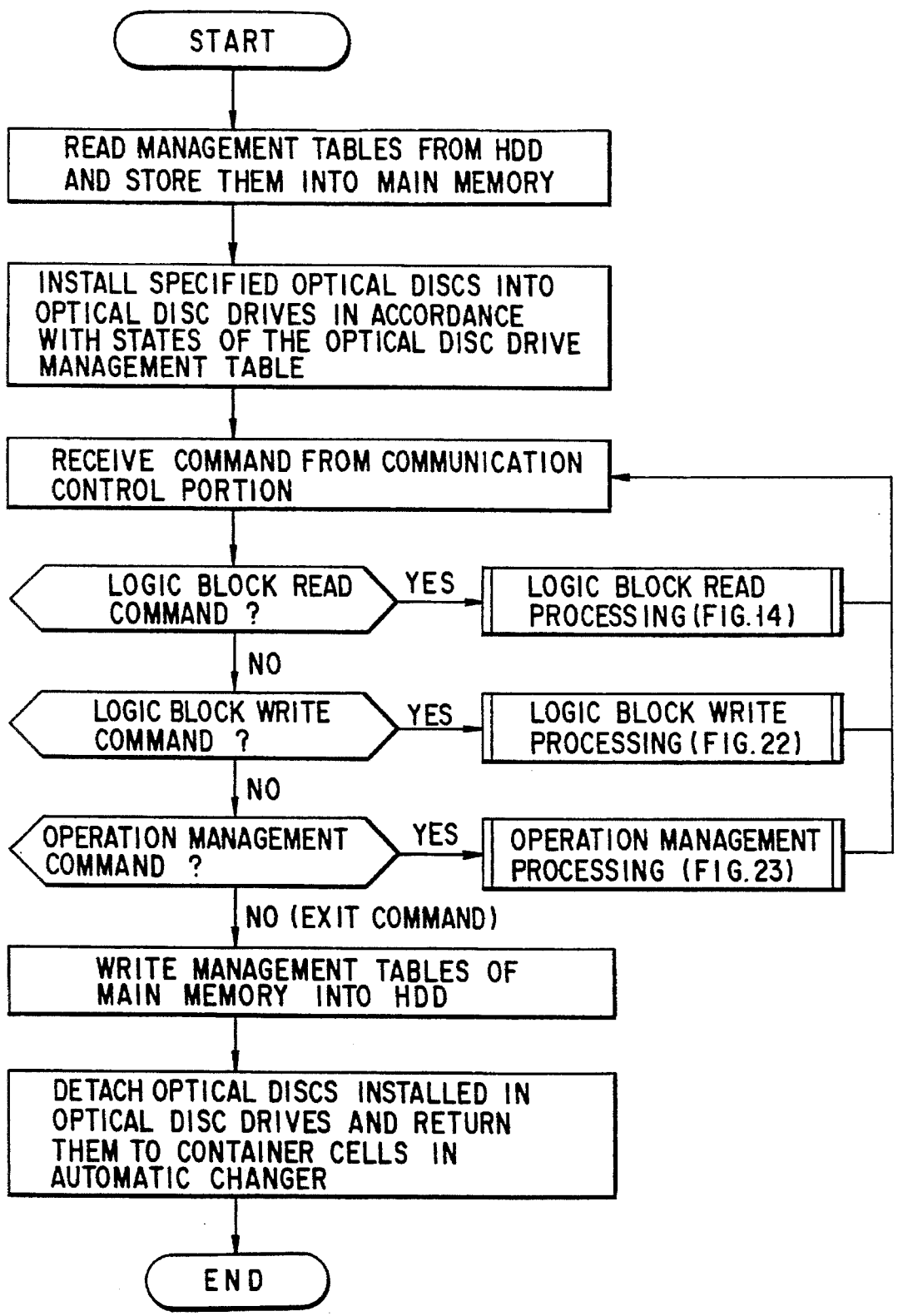
FIG. 13 is a flow-chart for explaining processing of an optical disc apparatus.

FIG. 13 is a flow-chart schematically showing the total processing operation of the present apparatus. At first, management tables 31 to 37 shown in FIGS. 6 to 12 are read from a cache HDD 3, and stored into a main memory 2. Then, designated optical discs 24 are installed into optical disc drives 22a to 22d in accordance with the contents of the optical disc drive management table 37 (FIG. 12). Thereafter, commands supplied from an external device are received by a communication control portion 8, and processing is performed in accordance with each of the commands.

Figure 22:
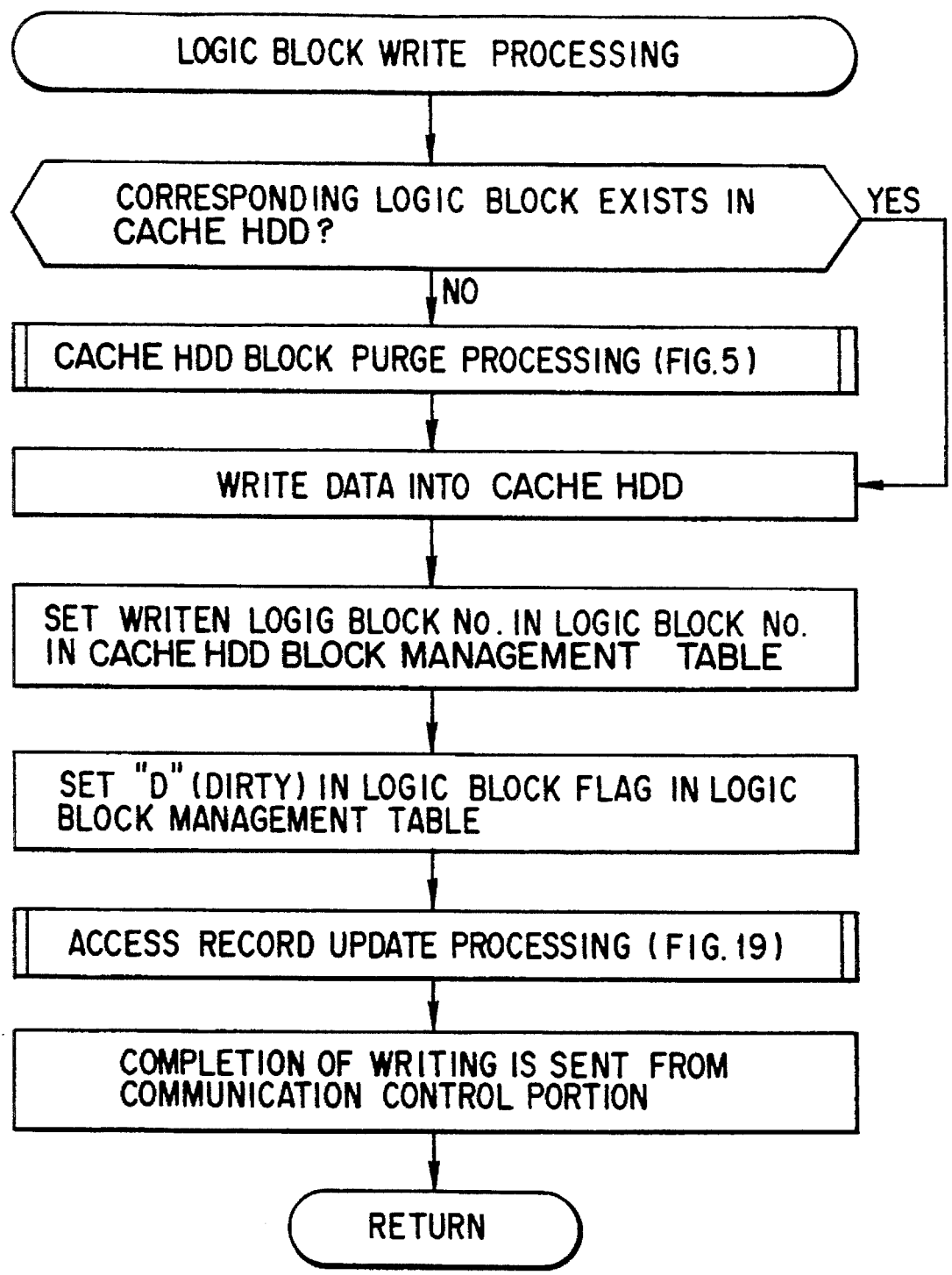
FIG. 22 is a flow-chart for explaining logic block write processing.

When a command of "reading a logic block" is received, processing for reading a logic block designated by an external device is performed (FIG. 14). When a command of "writing a logic block" is received, processing for writing a block data item supplied from an external device, into a designated logic block is performed (FIG. 22). When a command of "operation management" is received, operation management processing is performed (FIG. 23). When a command of "end" is received, the data items of the management tables 31 to 37 in the main memory 2 are saved and written into the HDD 3, and the optical discs 24 installed in the optical disc drives 22a to 22d are returned to container cells 21b to 21k. Then, the processing is finished.

FIG. 14 shows a flow-chart of logic block reading processing. At first, a cache HDD block management table 35 (FIG. 10) is searched, and whether or not a designated logic block exists in the cache HDD 4 is checked. If exists, processing for updating access records of the designated logic block is performed (FIG. 19), and the data item of the logic block in the cash HDD 4 is supplied to an external device through a communication control portion 8. Then, the processing flow is returned.

Figure 18:
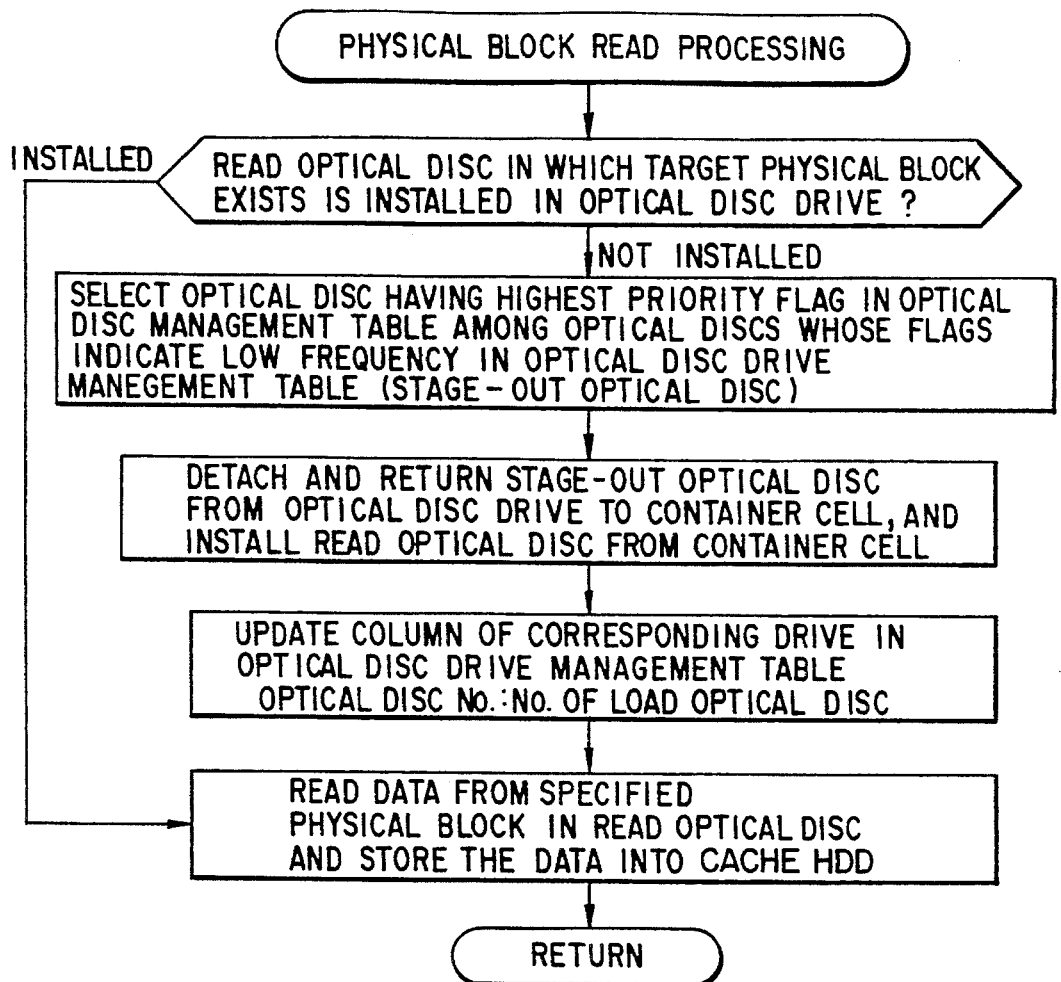
FIG. 18 is a flow-chart for explaining physical block read processing.

If the designated logic block does not exist in the cache HDD 4, processing for staging out the data item of the logic block which is accessed at the least frequency in the logic blocks in the cache HDD 4 is performed (FIG. 15). As a result of this, an empty space equivalent to one block is retained in the cache HDD 4. Processing for reading a target data item onto the empty space from the corresponding physical block of the optical disc 24 which includes the designated logic block is performed (FIG. 18). In the cache HDD block management table 35, the "logic block No." corresponding to the "cache HDD block No." into which the target data item is read is updated. In the logic block management table 33 (FIG. 8), the corresponding logic flag is set to "C". Processing for updating access records (FIG. 19) and processing for transferring data to an external device are performed, and the processing flow is returned.

FIG. 15 shows a flow-chart of processing for selecting a logic block which is accessed at the lowest frequency among logic blocks of the cache HDD 4 in accordance with the logic block management table 33 (FIG. 8) and for staging out the selected logic block from the cache HDD 4, in order to prepare an empty space in the cache HDD 4.

Figure 20:
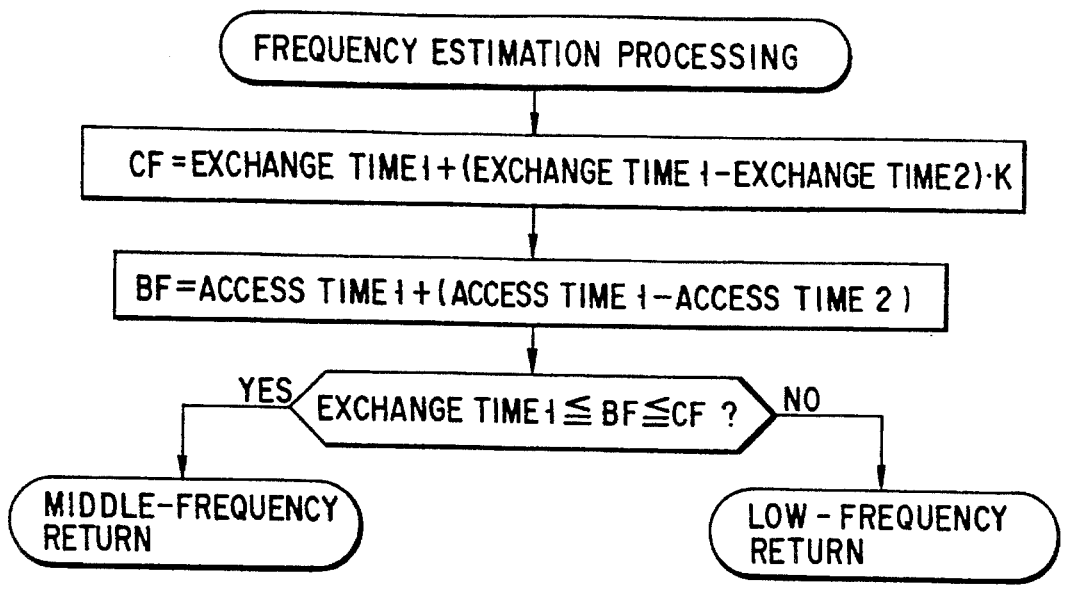
FIG. 20 is a flow-chart for explaining frequency estimation processing.

At first, a logic block whose access time point 2 is the oldest is selected from logic blocks existing in the cache HDD 4. The selected block is called a stage-out block. Next, frequency estimation processing is performed with respect to the selected stage out block (FIG. 20). When the stage out block is estimated to be a block which will be accessed at a low-frequency, the logic flag of the stage out block will further be referred to (FIG. 8). When the stage out block is estimated to be accessed at a low-frequency and the logic flag indicates C (clean), the logic flag is simply set to "O" and the processing flow is returned.

Figure 16:
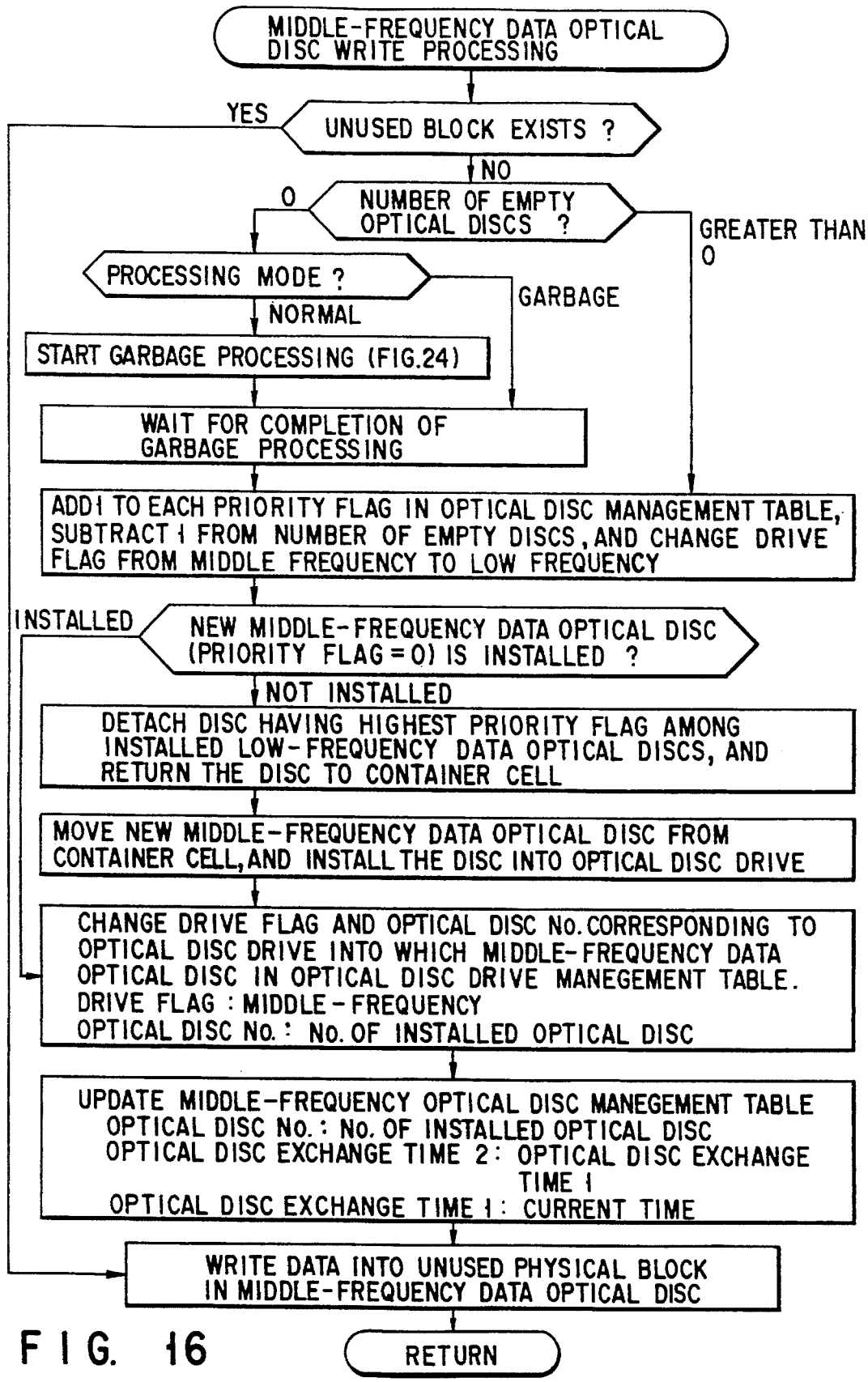
FIG. 16 is a flow-chart for explaining write processing to an optical disc used as a middle frequency storage.
Figure 17:
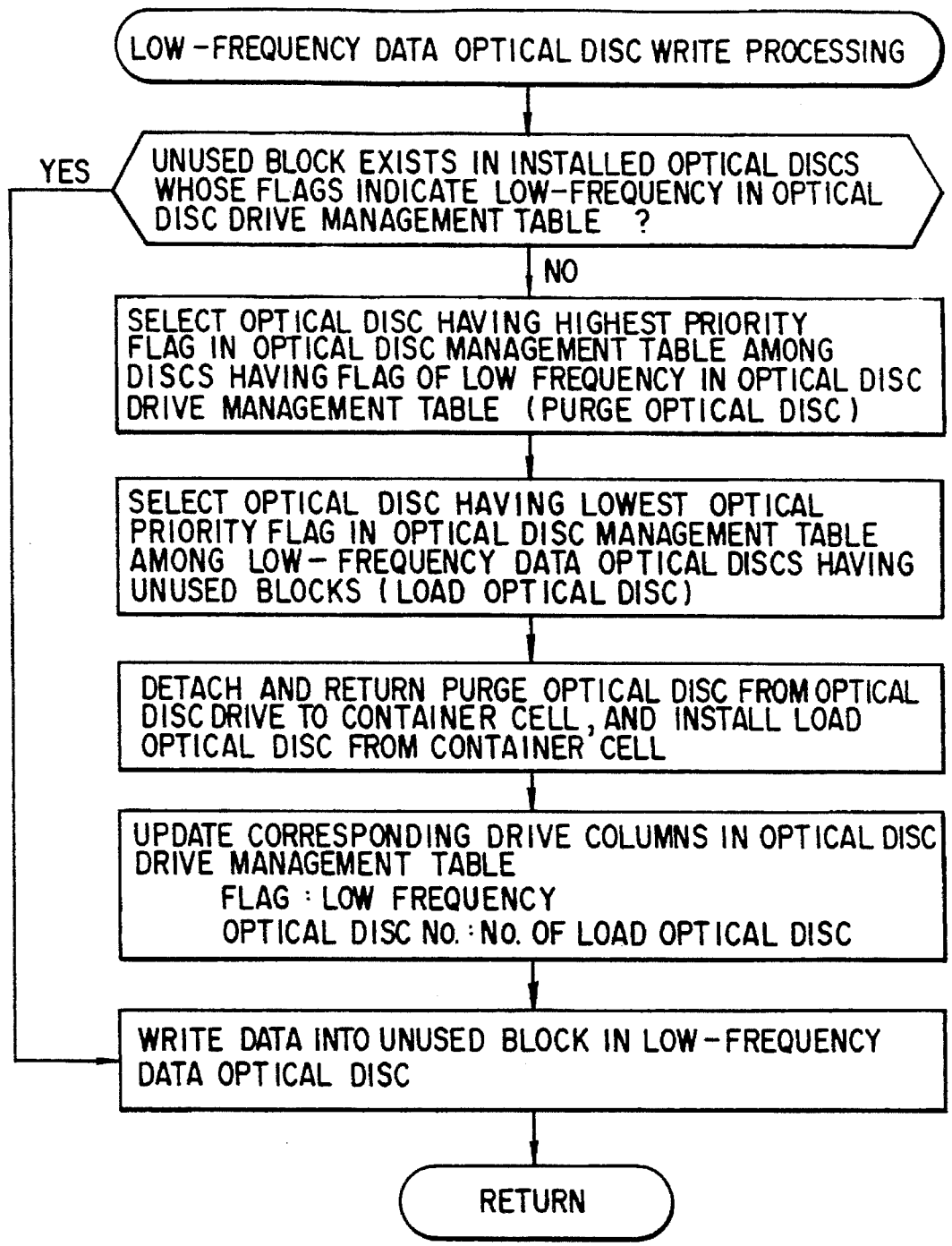
FIG. 17 is a flow-chart for explaining write processing to an optical disc used as a low frequency storage.

When the stage-out block is estimated to be accessed at a low-frequency and the logic flag indicate D (dirty: which means the contents of the data item corresponding to the stage-out block has been updated), processing for writing the updated data item in the cache HDD 4 into an optical disc 24 for storing low-frequency data items is performed (FIG. 17). Then, the physical flag of the physical block to which the logic block is newly stored is changed from "unused" to "used". The physical flag of the optical disc for storing low-frequency data items in which the stage-out block was originally stored is changed from "used" to "unused". In the logic block management table 33, the "optical disc No." of the disc and the "physical block No." of the block, into which the stage-out block is thus newly stored, are set, and the "logic flag" is changed to "O", and the processing flow is returned. However, when unused physical blocks does not exist in the optical discs 24 for storing low-frequency data items, the same processing as in the case where the block is accessed at a middle-frequency, which will be described below, is performed (FIG. 16).

When the stage-out block is estimated to be accessed at a middle-frequency, the data item of the logic block existing in the cache HDD 4 is written into the optical disc 24 for storing middle-frequency data items. Then, processing for making the physical block in the optical disc 24 for storing low-frequency data items, in which the stage-out block was originally stored, "unused" is performed (FIG. 16). Further, corresponding block Nos. in the physical block management table 34 (FIG. 9) and in the logic block management table 33 (FIG. 8) are changed and the processing is returned.

FIG. 16 is a flow-chart showing processing for writing a logic block of the stage-out block, which is estimated to be accessed at a middle-frequency, into the optical disc 24 for storing middle frequency data items. At first, whether or not an unused physical block exists in the optical disc for storing middle-frequency data items is checked. If an unused block exists, the stage-out block from the cache HDD 4 is written into an unused physical block in the optical disc 24 for storing middle-frequency data items.

If no unused block exists in the optical disc 24 for storing middle frequency data items, the number of empty optical discs is checked (FIG. 6). If there is no empty optical disc, garbage collection is started (FIG. 24) and the processing is kept in a stand-by state until the garbage collection is completed. If the garbage collection has already been started (the processing mode indicates "garbage"), the processing is also kept in a stand-by state until the garbage collection is completed.

Next, "1" is added to each of the values of all the priority flags in the optical disc management table 36 (FIG. 11), while "1" is subtracted from the number of empty optical discs. The drive flags in the optical disc drive management table 37 are changed from "middle-frequency" to "low-frequency". Then, processing for installing an optical disc 24 for storing middle-frequency data items whose priority flag is newly set to "0" is performed.

When discs are installed in all of the optical disc drives 22a to 22d, an optical disc whose priority flag value is the largest among the installed optical discs 24 for storing low-frequency data items is selected. The selected optical disc is detached from the optical disc drive, and the detached optical disc is contained into the corresponding container cell. Then, an optical disc 24 for storing middle-frequency data items is installed into the optical disc drive. Further, the corresponding drive flag in the optical disc drive management table 37 (FIG. 12) is set to "middle-frequency", and the optical disc No. of the optical disc drive into which the optical disc for storing middle-frequency data items is installed is updated. In the middle-frequency data optical disc management table 32 (FIG. 7), the optical disc No. is updated, and the value of the optical disc exchange time point 1 is set as the value of the optical disc exchange time point 2, while the current time point is set as the value of the optical disc exchange time point 1. Thereafter, the same processing as performed when an unused physical block exists is performed and the processing is returned.

FIG. 17 is a flow-chart showing processing for writing a stage-out block into an optical disc 24 for storing low-frequency data items when a stage-out block is estimated to be accessed at a low frequency and the logic flag indicates D (dirty).

At first, whether or not an unused physical block exists in installed optical discs 24 for storing low-frequency data items is checked. If exists, the data item of a stage-out block is written into the unused physical block, and the processing is returned. If an unused physical block does not exist in the installed optical discs for storing low-frequency data items, an optical disc whose priority flag value is largest is selected from these three installed optical discs. The selected optical disc is called a stage-out optical disc. Then, an optical disc whose priority flag value is smallest is selected from those optical discs 24 for storing low-frequency data items which include unused physical blocks. The optical disc thus selected is called a load optical disc. Thereafter, the stage-out optical disc installed in an optical disc drive is detached and returned to one of container cells 21a to 21k. The load optical disc in a container cell is installed into the optical disc drive, and the optical disc drive management table 37 is updated. The stage-out block is written into an unused physical block in this optical disc 24, and the processing is returned.

FIG. 18 is a flow-chart showing processing for reading a physical block. At first, whether or not the optical disc 24 designated by an external device is installed in the optical disc drives is checked. If installed, the data item of the designated physical block is read out and stored into an empty block retained in the cache HDD 4 by the stage-out processing for the cache HDD block, and the processing is returned.

If the designated optical disc 24 is not installed in the optical disc drives, an optical disc 24 whose priority flag value is largest (i.e., a stage-out optical disc) is selected from the optical discs 24 for storing low-frequency data items which are installed in the optical disc drives. The stage-out optical disc is detached from the optical disc drive and returned to one of container cells 21*a* to 21*k*. The designated optical disc 24 is installed into the optical disc drive. Then, the optical disc drive management table 37 is updated, and the data item of the designated physical block is read out from the optical disc 24 installed into the optical disc drive. The data item thus read out is stored into an empty block in the cache HDD 4 which is retained by stage-out processing performed with respect to the cache HDD, and the processing is returned.

Figure 19:
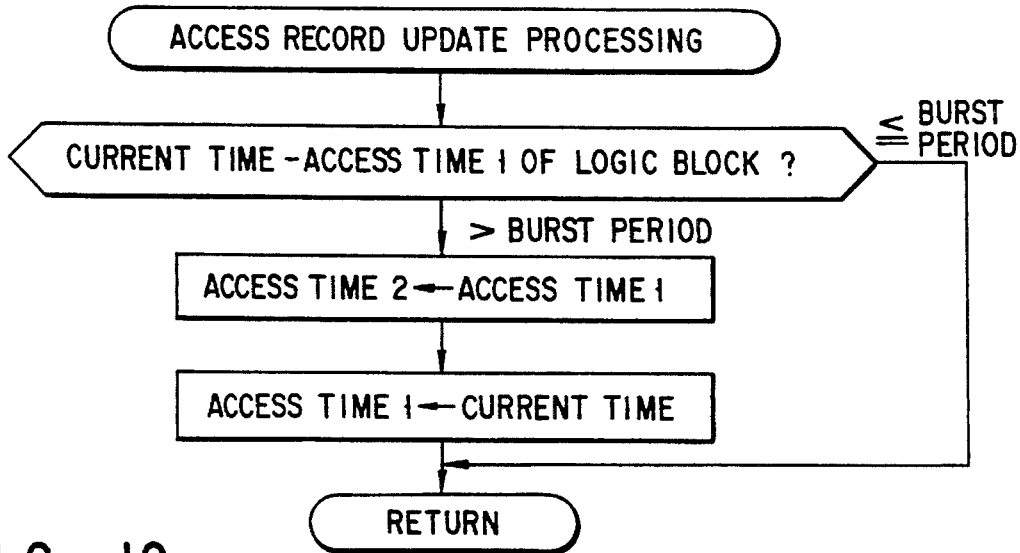
FIG. 19 is a flow-chart for explaining access record update processing.

FIG. 19 is a flow-chart showing access record update processing which is performed when a logic block is accessed by an external device. At first, whether or not the difference between the access time point 1 of an accessed logic block and the current time point is greater than a burst period is checked. If the difference is not greater than the burst period, the current access is regarded as being concentrated and access records are not updated. If the difference is greater than the burst period, the value of the access time point 1 is set as the access time point 2 shown in FIG. 8, and the current time point is set as the access time point. The processing is then returned. In the present apparatus, the burst period is set to 60 seconds. Specifically, even if a logic block is accessed for a plurality of times within 60 seconds, these access operations are regarded as one single application, i.e., one single access operation. Therefore, access records are not updated.

FIG. 20 is a flow-chart showing processing for estimating a frequency with which a logic block to be staged out is accessed. At first, the: value of CF is calculated from exchange records of the optical disc 24 for storing middle-frequency data items, the value of BF is calculated from access records of the logic block, and whether or not the value BF exists within the period defined between the exchange time point 1 of the optical disc 24 for storing middle-frequency data items and the value CF. If the value BF exists within this period, the stage-out block is determined to be accessed at a middle-frequency, and the processing is returned. If the value BF is out of the period, the stage-out block is determined to be accessed at a low-frequency, and the processing is returned.

Figure 21:
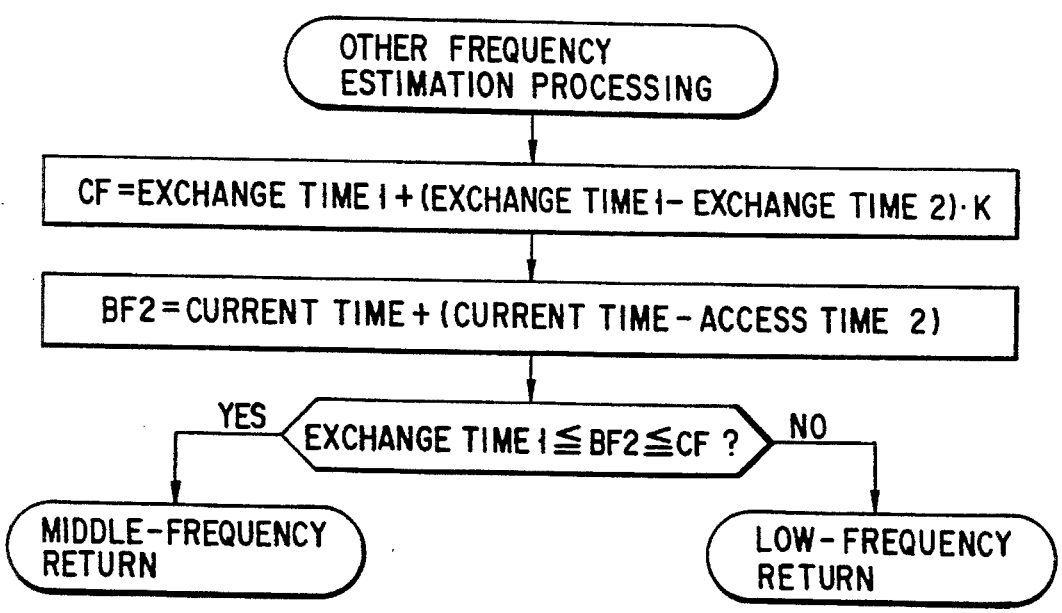
FIG. 21 is another flow-chart for explaining frequency estimation processing.

FIG. 21 is a flow-chart showing processing for estimating other frequencies. At first, the value CF is calculated from exchange records of the optical disc 24 for storing middle-frequency data items, the value BF2 is calculated from access records of a logic block, and whether or not the value BF2 exists within a period defined between the exchange time point 1 of the optical disc 24 for storing middle-frequency data items and the value CF is checked. If the value BF2 exists within this period, the logic block is determined to be accessed at a middle frequency and the processing is returned. If the value BF2 is out of the period, the logic block is determined to be accessed at a low frequency and the processing is returned.

FIG. 22 is a flow-chart of processing which is performed when a logic block is designated by an external device and a logic block write command is received. At first, whether or not the designated logic block exists in the cache HDD 4 is checked. If the logic block does not exist therein, the block stage-out processing is performed with respect to the cache HDD 4, as shown in FIG. 15, and a write region is retained in the cache HDD 4. Then, data is written into the write region. Further, the logic block No. in the cache HDD block management table 35 is updated, and the logic flag of the logic block management table 33 is set to D (dirty). Thereafter, processing for updating access records with respect to the logic block is performed as shown in FIG. 19, and at last, the completion of writing is notified to an external device by a communication control portion 8. Then, the processing is returned.

FIG. 23 shows a flow-chart of processing which is performed when an operation management command is received from an external device. In this processing, processing such as supplement of optical discs 24 or forced garbage collection is performed in accordance with an operation management command.

Figure 25A:
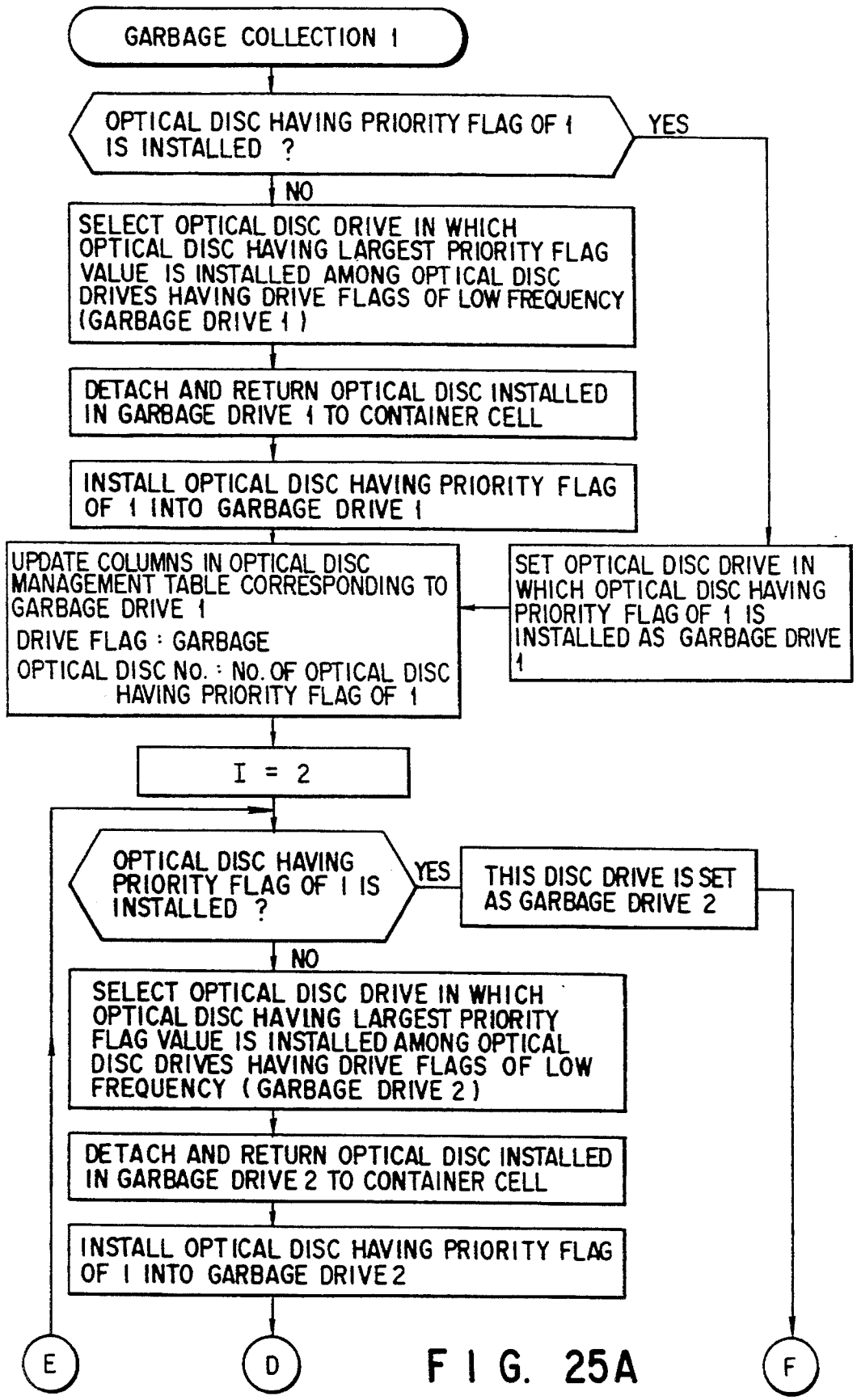
FIG. 25A to 25C are flow-charts for explaining a garbage collection 1.
Figure 25B:
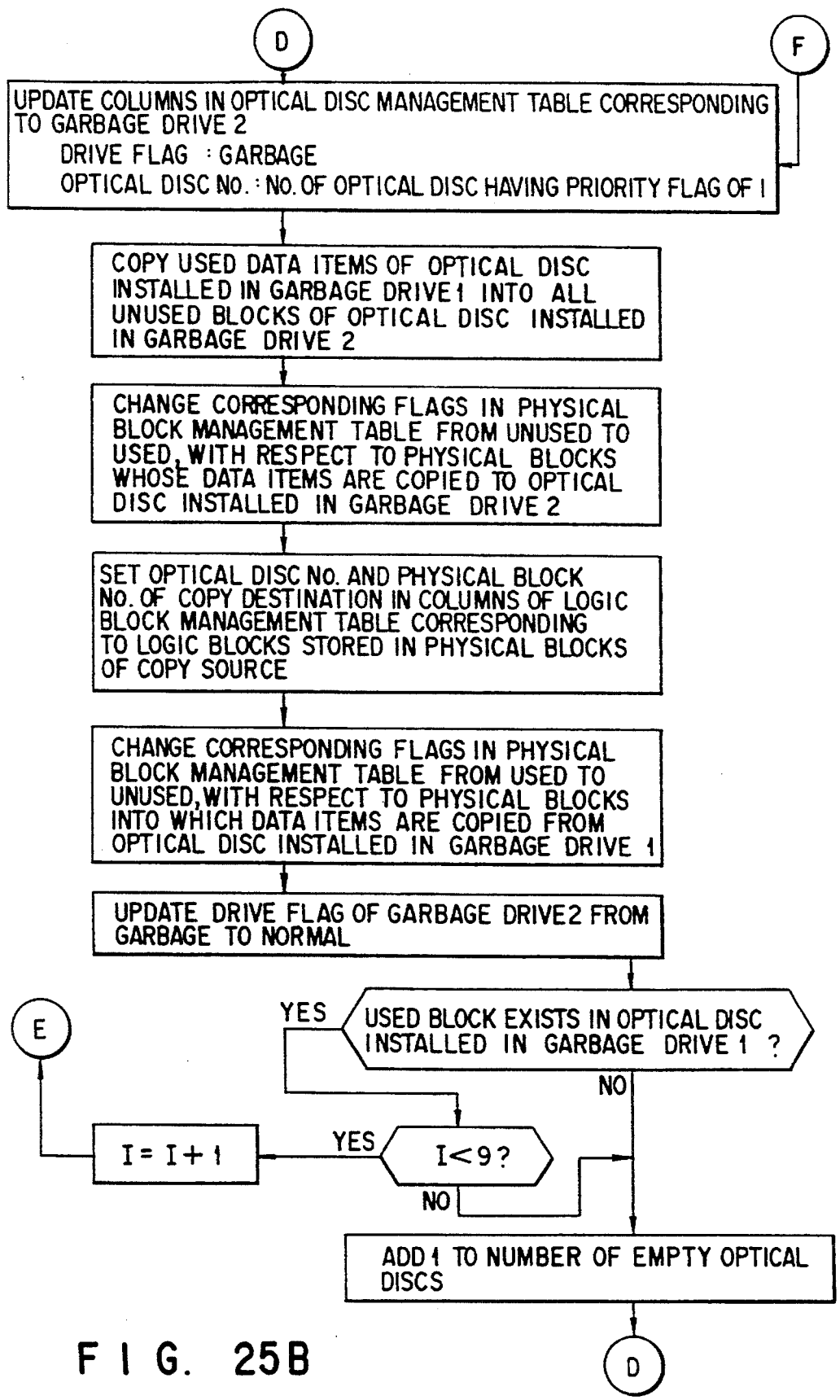
Figure 25C:
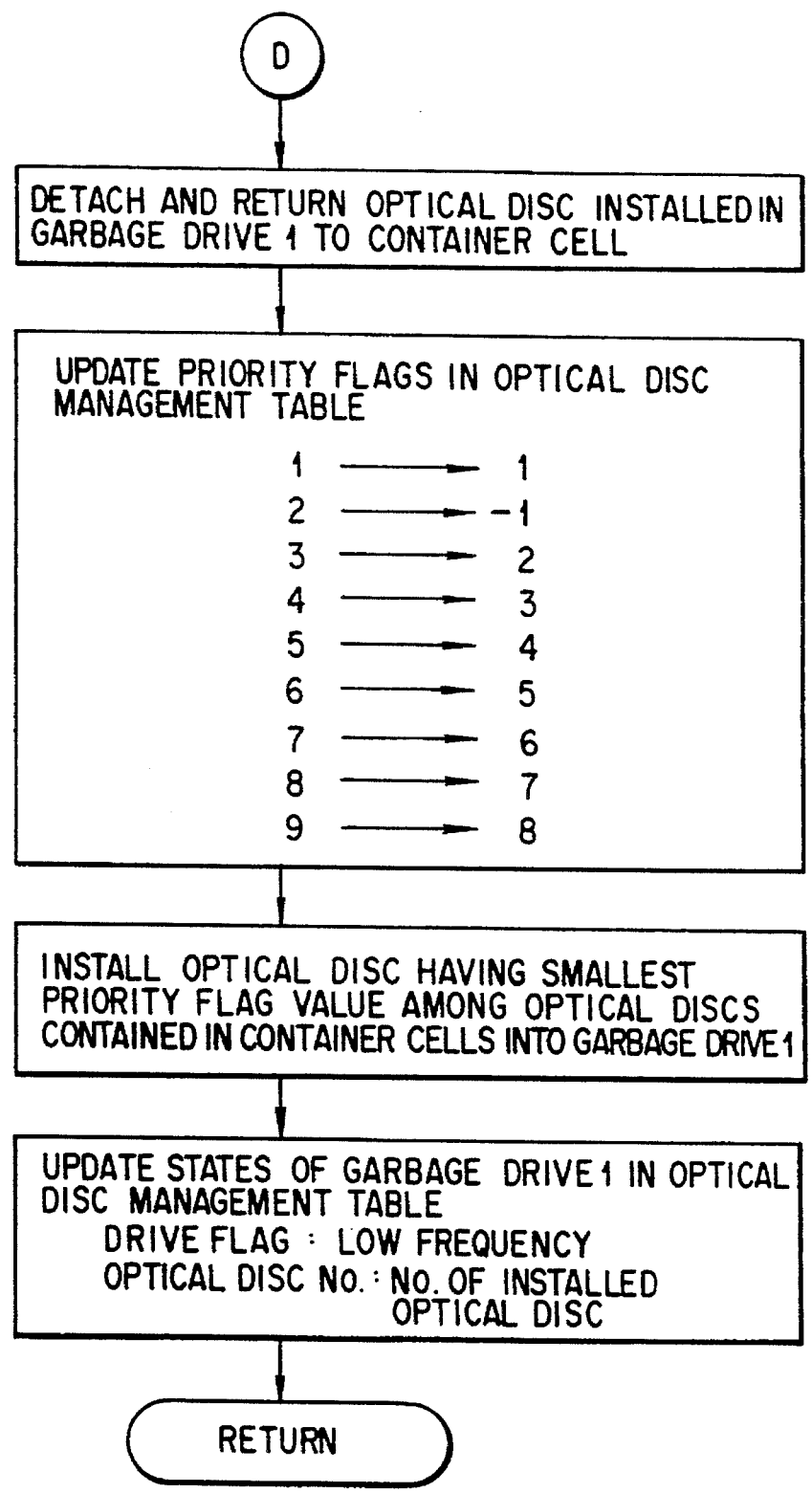
Figure 26B:
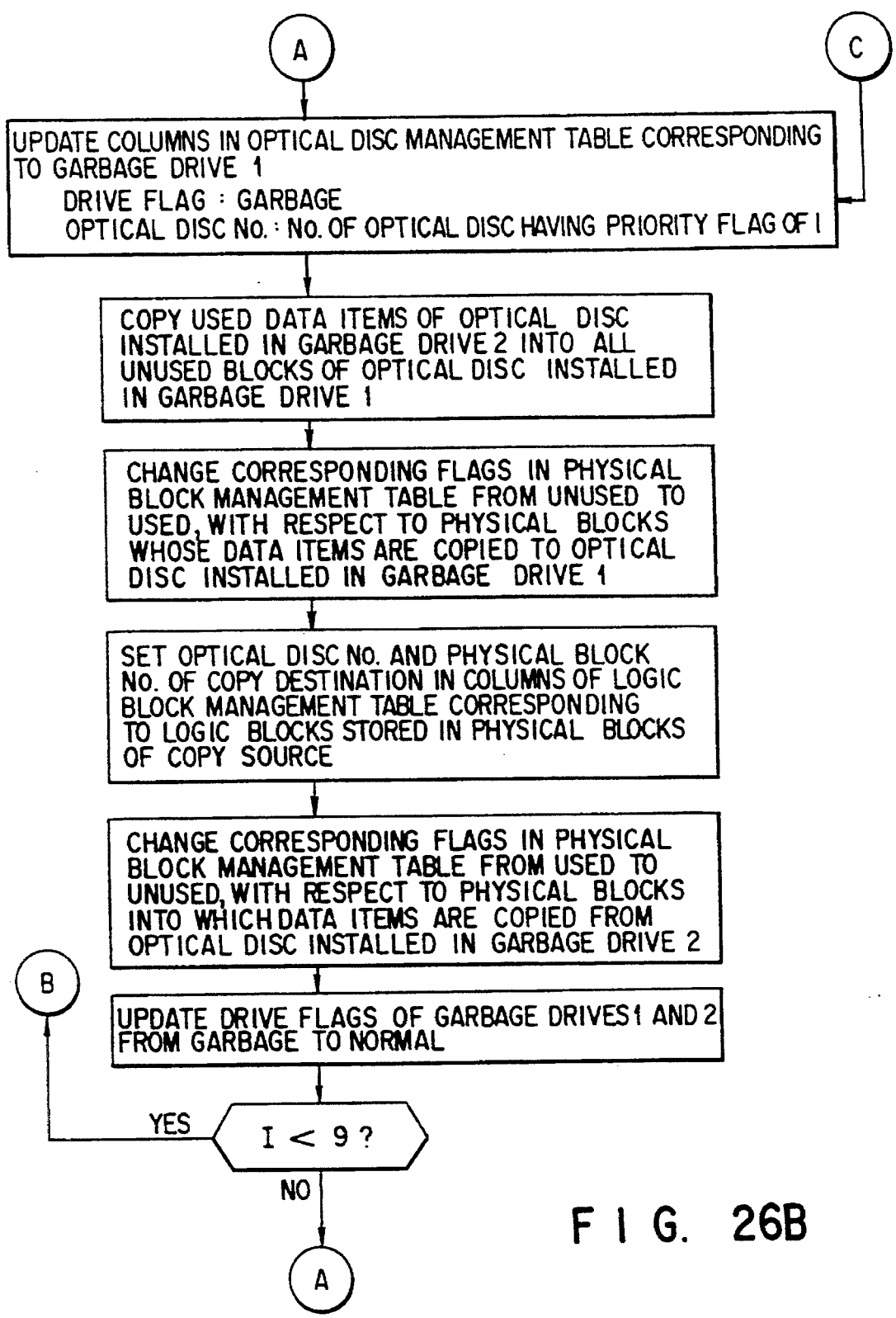
Figure 26C:
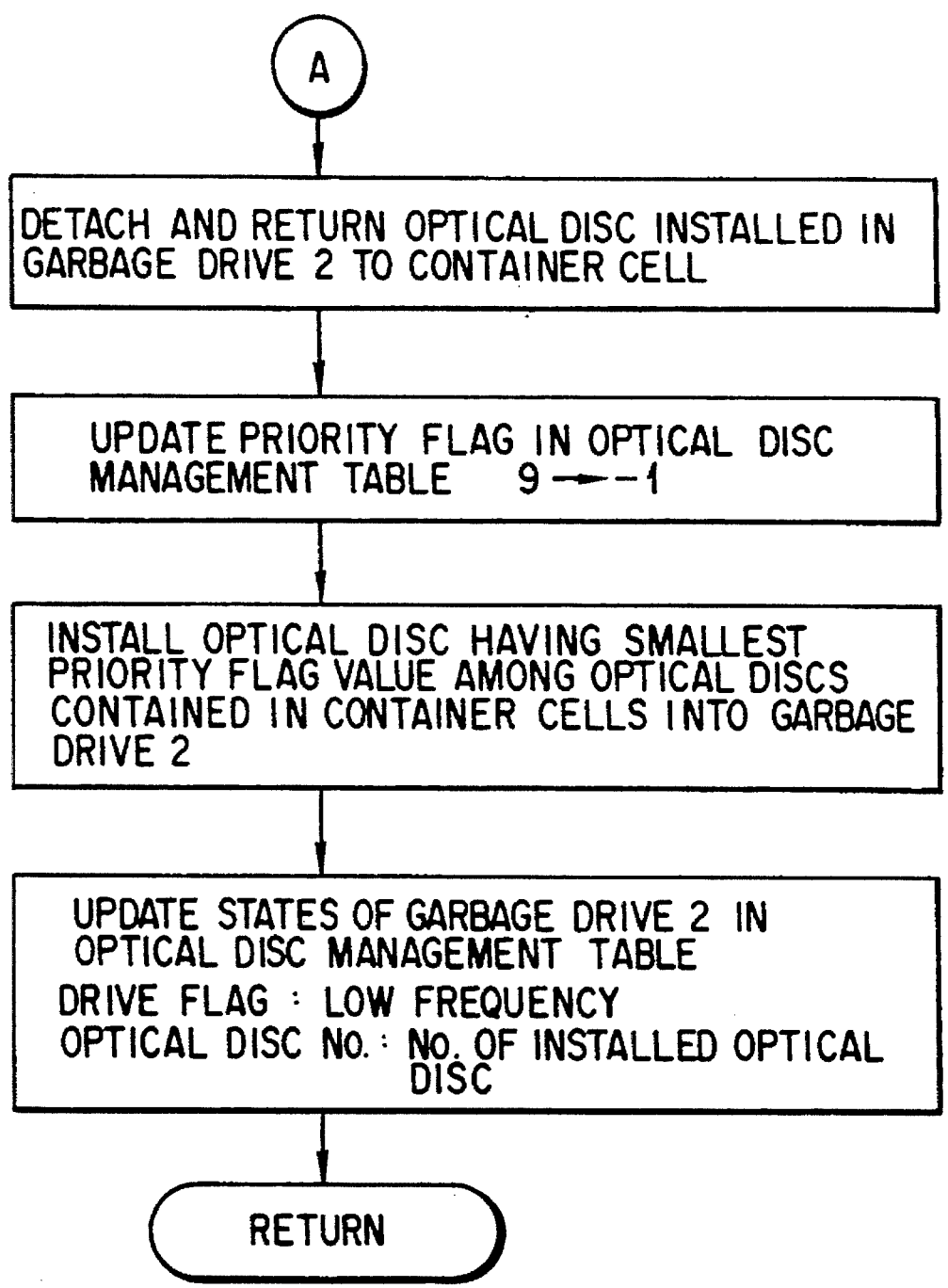

FIG. 24 shows a flow-chart of garbage collection which is started when write processing is performed with respect to an optical disc 24 for storing middle-frequency data items, as shown in FIG. 16. At first, the processing mode in the structure management table 31 (FIG. 6) is set to "garbage". Then, the difference between the optical disc exchange time points 1 and 2 in the middle-frequency data optical disc management table 32 is obtained. When the value of the obtained difference is smaller than a predetermined period Ta, garbage collection 1 is performed (FIGS. 25A to 25C). When the value of the difference is equal to or greater than the period Ta, garbage collection 2 is performed (FIGS. 26A to 26C). The processing mode is returned to "normal", one is added to the number of empty discs and the processing is finished.

The fact that the difference between the two exchange time points is smaller than Ta means that the optical disc 24 for storing middle-frequency data items is frequently exchanged with another disc and that the processing ability of the present apparatus is insufficient for covering the processing performed according to commands from an external device. Therefore, when the difference is smaller than the period Ta, garbage collection 1 is performed in which blocks are moved only for short distances. On the contrary,. When the difference is equal to or greater than the period Ta, the processing ability of the apparatus allows a sufficient margin, and therefore, garbage collection 2 in which priority is given to the arrangement order of blocks according to the access frequencies is performed.

FIGS. 25A to 25C show flow-charts of garbage collection 1, and FIG. 4 schematically shows processing of the garbage collection 1. At first, whether or not an optical disc 24 for storing low-frequency data items which has a priority flag of "1" is installed in optical disc drives 22*a* to 22*d* is checked. If such an optical disc is not installed in the disc drives, an optical disc drive in which an optical disc having the largest priority flag among the installed optical discs 24 for storing low-frequency data items is installed is selected from the optical disc drives 22*a* to 22*d*. The selected disc drive is defined as a garbage drive 1, and an optical disc 24 for storing low-frequency data items whose priority flag indicates "1" is installed into the selected disc drive.

If an optical disc 24 for storing low-frequency data items whose priority flag indicates "1" has already been installed in one of the optical disc drives 22*a* to 22*d*, the one optical disc drive is defined as a garbage drive 1. Thereafter, in the optical disc drive management table 37, the drive flag corresponding to the garbage drive 1 is set to "garbage" and the "optical disc No." is set to the No. of the optical disc 24 installed in the garbage drive 1.

Next, processing for copying physical blocks, in which the data items of the optical disc 24 installed in the garbage drive 1 and storing low-frequency data items are stored, into unused physical blocks of the other optical discs 24 for storing low-frequency data items is carried out. As shown in FIG. 4, this processing is performed with respect to optical discs 24 for storing low-frequency data items whose priority flags are "2" to "9", in this order, and continued until all the used physical blocks of the optical disc 24 for storing low-frequency data items which has a priority flag of "1" are copied. In this case, the optical disc drive which is used as the copy destination is called a garbage drive 2. In this processing, the physical flag of the used physical block as the copy source is set to "unused" and the physical flag of the unused physical block as the copy destination is set to "used", in the physical block management table 34. Further, in the logic block management table 33, the optical disc No. and the physical block No. which indicate the data storage position is updated.

When the copying of physical blocks is completed, the optical disc 24 in the garbage drive 1, which is completely empty, is detached therefrom and returned to a container cell. Then, "1" is subtracted from each of the priority flags 1 to 9 in the optical disc management table 36. Finally, an optical disc 24 for storing low-frequency data items, which has the smallest priority flag, is selected from optical discs in the container cells 21a to 21d, and the selected disc is installed into the garbage drive 1. The corresponding drive flag in the optical disc drive management table 37 is set to "low-frequency", and the corresponding optical disc No. is set to the No. of the installed optical disc 24. The processing is then returned.

FIGS. 26A to 26C show flow-charts of garbage collection 2, and FIG. 5 schematically shows the processing of the garbage collection 2. At first, 1 is substituted into a parameter "I". Whether or not an optical disc 24 for storing low-frequency data items, which has a priority flag of "I", is installed in one of optical disc drives 22a to 22d is checked. If not installed, an optical disc drive in which an optical disc 24 for storing low-frequency data items, which has the largest priority flag, is installed is selected from the optical disc drives 22a to 22d, and the selected optical disc drive is defined as the garbage drive 1. The optical disc 24 for storing low-frequency data items, which has a priority flag of "I", is installed into the garbage drive 1.

If an optical disc 24 for storing low-frequency data items, which has a priority flag of "1", has already been installed in one of optical disc drives 22a to 22d, the one optical disc drive is set as a garbage drive 1. Thereafter, in the optical disc drive management table 37, the drive flag corresponding to the garbage drive 1 is set to "garbage" and the corresponding "optical disc No." is set to the No. of the optical disc which has been installed in the garbage drive 1. Next, a is added to the parameter "I", and the same processing as stated above is performed, so that an optical disc 24 for storing low-frequency data items, which has a priority flag of "I", is installed into the garbage drive 2.

Thereafter, data items of used physical blocks of the optical disc 24 for storing low-frequency data items, installed in the garbage drive 2, are copied into unused physical blocks of the optical disc 24 for storing low-frequency data items, installed in the garbage drive 1. Then, in the physical block management table 34, the physical flags of "used" physical blocks which serve as copy sources are set to "unused", and the physical flags of "unused" physical blocks which serve as copy destinations are set to "used". Further, in the logic block management table 33, the optical disc No. and the physical block No. indicating the data storage destinations are updated.

Next, the drive flags of the garbage drives 1 and 2 are reset to "normal". The above processing is repeatedly performed until the parameter "I" reaches 9.

Thereafter, the optical disc 24 installed in the garbage drive 2, which is completely occupied by empty regions, is detached from the drive and is returned to a container cell. The priority flag of the empty optical disc 24 is changed fro 9 to −1. Finally, an optical disc 24 which has the smallest priority flag is selected from the optical discs 24 for storing low-frequency data items, contained in the container cells 21a to 21k, and the selected optical disc is installed into the garbage drive 1. In the optical disc drive management table 37, the drive flag corresponding to the garbage drive 1 is set to "low-frequency", and the optical disc No. is set to the No. of the optical disc 24 thus selected and installed. Then, the processing is returned.

As has been explain above, the access frequency is estimated with respect to the data item which is staged out from the cache HDD storing data items which are accessed at frequencies. The data item which is estimated to be accessed at a middle frequency is written into an optical disc for storing middle-frequency data items, which is installed in one of optical disc drives 22a to 22d and which is accessed at a relatively high probability. The data item which is estimated to be accessed at a low frequency and whose contents have been updated is written into an optical disc for storing low-frequency data items, which is also installed in one of optical disc drives 22a to 22d and which is accessed at a low probability.

Therefore, access to optical discs is concentrated to the optical disc for storing middle-frequency data items or the optical discs for storing low-frequency data items which are all installed in the optical disc drives. As a result, exchanges of optical discs can be reduced in number of times, and thus, the response ability of the apparatus can be improved.

Further, frequency estimation processing is carried out to determine a destination storage every time when an data item is accessed, an data item is copied to a cash HDD, and a data item is staged out from the cash HDD. Therefore, even when the pattern of accessing data items varies and the group of accessed data items changes in accordance with time (e.g., from a group of low-frequency data items to a group of middle-frequency data items or the versus), data is re-arranged in accordance with such variation or changes, and as a result, the response ability of the apparatus can also be improved.

In addition, although garbage collection for collecting unused regions to prepare an empty optical disc requires much time, normal processing such as reading of an image required by an external device can be performed with priority to the garbage collection, since methods of garbage collection are selected in accordance with operational states of the apparatus. Specifically, when an optical disc for storing middle-frequency data items is filled with data, reference is made to past records which indicate operational states (e.g., the frequency with which access is required by an external device). If there is much time to spare, garbage collection 1 is carried out, and if there is no time to spare, garbage collection 2 is carried out.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing system comprising:

a memory access device for accessing data in a memory;

a data processing device for accessing data in a first portable medium and a second portable medium, at a lower data access processing speed than the memory access device;

estimation means for estimating an access frequency at which data is accessed;

first processing means for storing data which is estimated to be accessed at a high access frequency, in the memory on a basis of an access frequency estimated by the estimation means;

second processing means for storing data which is estimated to be accessed at a middle access frequency in the first portable medium, on a basis of an access frequency estimated by the estimation means;

third processing means for storing data which is estimated to be accessed at a low access frequency in the second portable medium, on a basis of an access frequency estimated by the estimation means; and management means for managing the first portable medium on which the data is estimated to be accessed at the middle access frequency is stored, so as to be continuously inserted in the data processing device.

2. A data processing system according to claim 1, further comprising:

container means for containing a plurality of portable media;

means for exchanging the portable medium between the container means and the data processing device; and priority level application means for respectively applying priority levels based on access frequencies of the plurality of portable media comprised in the system, said priority level application means including priority level changing means for, when the first portable medium is filled with stored data, changing the priority levels by newly defining another one of the plurality of portable media as a first portable medium.

3. A data processing system according to claim 2, further comprising:

empty portable medium preparation means for preparing an empty portable medium by transferring data stored in one of the plurality of portable media to an empty region in the portable medium having a higher priority level than the one of the plurality of portable media, wherein the priority level changing means includes priority changing means for, when there is no unused region remaining in the first portable medium, defining the empty portable medium prepared by the empty portable medium preparation means as the first portable medium.

4. A data processing system according to claim 2, further comprising:

first empty portable medium preparation means for preparing an empty portable medium by transferring data stored in one of the plurality of portable media to an empty region in the portable medium having a higher priority level than the one of the plurality of portable media; and second empty portable medium preparation means for preparing an empty portable medium by transferring all data stored in a specific one of the plurality of portable media to an unused region of another one of the plurality of portable media, wherein said priority level changing means includes first means for preparing, when there is no unused region remaining in one of the portable mediums having a highest priority level inserted in the data processing device, preparing an empty portable medium using the first empty portable medium preparation means if an interval between change times recorded by the priority level change record means is longer than a predetermined time period and second preparing means for preparing an empty portable medium using the second empty portable medium if the interval is shorter than the predetermined time period.

5. A data processing system comprising:

a memory access device for accessing data in a memory;

a data processing device for accessing data in a first portable medium and a second portable medium, at a lower data access processing speed than the memory access device;

estimation means for estimating an access frequency at which data stored in the memory is accessed, when an amount of data stored in the memory exceeds a predetermined amount;

first processing means for storing data which is estimated to be accessed at a middle frequency on the first portable medium, on a basis of the access frequency of the data item estimated by the estimation means;

second processing means for storing data which is estimated to be accessed at a low access frequency on the second portable medium, on a basis of the access frequency estimated by the estimation means; and managing means for managing the first portable medium on which the data estimated to be accessed at the middle access frequency is stored so as to be continuously inserted in the data processing device.

6. A data processing system according to claim 5, further comprising:

container means for containing a plurality of portable media;

means for exchanging the portable media between the container means and the data processing means;

stage out means for staging out data having a lowest access frequency of data stored in the memory when the memory is filled with stored data; and selective storing means for storing the data supplied from the stage out means on one of the first and second portable media selected in accordance with the access frequency, wherein the estimation means includes first definition means for defining a data item having an access frequency equal to or higher than a predetermined value as a middle access frequency data item, and for defining a data item having an access frequency lower than the predetermined value.

7. A data processing system according to claim 6, wherein said frequency estimation means comprises:

record means for storing an access record of each data item stored in the data processing system; and calculation means for calculating an access frequency for each data item stored in the data processing system on a basis of the access record stored in the record means.

8. A data processing system according to claim 6, further comprising collection means for collecting empty regions of the plurality of portable media to prepare an empty portable medium which stores no data, wherein the first definition means includes second definition means for, when the first portable medium is filled with stored data, defining the empty potable medium prepared by the collection means as a first portable medium, wherein the selective storage means stores the data having an access frequency equal to or higher than the predetermined value on the first portable medium newly defined by the second definition means.

9. An data processing system according to claim 8, wherein the second definition means includes definition change time record means for recording a definition change time at which the empty portable medium prepared by the collection means is newly defined as the first portable medium, the access frequency estimation means including means for determining an interval period between a last definition change time point and a second to last definition change time point, both recorded by the definition change time point record means, and means for setting data supplied by the stage out means from the memory as data having an access frequency equal to or higher than the predetermined value if a time point obtained by a formula B1+(B1−B2) is within the interval period where a last access time point of the data supplied by the stage out means is B1 and a second to last access time point thereof is B2.

10. A data processing system according to claim 8, wherein said first definition means further comprises definition change time record means for recording a definition change time at which the empty portable medium prepared by the collection means is newly defined as the first portable medium;

the access frequency estimation means comprises:
means for determining an interval period between a last definition change time point and a second to last definition change time point, both being recorded by the definition change time point recording means; and means for setting the data from the stage out means from the memory as data having an access frequency equal to or higher than the predetermined value if a time point obtained by a formula of N+(N−B2) is within an interval period in which a second to last access time point of the data item supplied by the stage out means from the memory is B2 and a current time point is N.

11. A data processing system according to claim 8, wherein the empty portable preparation means includes means for preparing an empty portable medium by distributing all data stored in the first portable medium into other portable media.

12. A data processing system according to claim 8, further comprising means for classifying the plurality of portable media in the system in accordance with an order of access frequencies, wherein the empty portable medium preparation means includes means for preparing an empty portable medium, by subjecting the plurality of portable media except for the first portable medium, to processing for transferring data items of one of the plurality of portable media to empty regions of the portable medium having a higher access frequency than the one of the plurality of portable media.

13. A method for estimating a data access frequency, the method comprising the steps of:

a first storing step for storing an exchange record of a plurality of portable media;

a second storing step for storing an access frequency of data stored in the portable media;

a first estimating step for estimating an exchange time on a basis of an exchange record of the portable media:

a second estimating step for estimating a next access time on a basis of the access frequency of the data item stored in the portable media;

a comparing step for comparing the estimated exchange time of the portable media with the estimated next access time point of a data item; and a determining step for determining that the data item is a low frequency data item if the estimated next access time of the data item is after the estimated exchange time of the portable media.

14. A data processing method, for use in a system comprising a memory access device for accessing data in a memory and a data processing device for accessing data on a first portable medium and a second portable medium, at a lower data access processing speed than the memory access device, the data processing method comprising the steps of:

estimating an access frequency at which data stored in the memory is accessed when an amount of data stored in the memory exceeds a predetermined amount;

a first storing step for storing data which is estimated to be accessed at a middle access frequency into the first portable medium, on a basis of the access frequency estimated by the estimation step;

a second storing step for storing data which is estimated to be accessed at a low access frequency into the second portable medium, on a basis of the estimated access frequency; and continuously inserting the first portable medium on which the data item is estimated to be accessed at the middle access frequency into the data processing device.

* * * * *